(12) United States Patent
Kurtz et al.

(10) Patent No.: US 11,585,284 B1
(45) Date of Patent: Feb. 21, 2023

(54) METHODS FOR RE-COMBUSTION IN ENGINES

(71) Applicant: Ford Global Technologies, LLC, Dearborn, MI (US)

(72) Inventors: Eric Matthew Kurtz, Dearborn, MI (US); Jason Brian Martz, Canton, MI (US); Daniel Joseph Styles, Canton, MI (US); Joshua Zachary Fried, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/444,044

(22) Filed: Jul. 29, 2021

(51) Int. Cl.
| | | |
|---|---|---|
| *F02D 13/02* | (2006.01) | |
| *F02D 41/40* | (2006.01) | |
| *F01N 13/10* | (2010.01) | |
| *F02D 13/06* | (2006.01) | |
| *F02M 35/104* | (2006.01) | |

(52) U.S. Cl.
CPC ......... *F02D 13/0215* (2013.01); *F01N 13/10* (2013.01); *F02D 13/06* (2013.01); *F02D 41/401* (2013.01); *F02D 41/403* (2013.01); *F02M 35/104* (2013.01); *F02D 2200/0802* (2013.01); *F02D 2200/101* (2013.01)

(58) Field of Classification Search
CPC ...... F02D 13/02; F02D 13/0215; F02D 13/06; F02D 41/40; F02D 41/401; F02D 41/403; F02D 2200/0802; F02D 2200/101; F02M 35/104; F01N 13/10
See application file for complete search history.

(56) References Cited

U.S. PATENT DOCUMENTS

| | | | |
|---|---|---|---|
| 6,311,653 B1* | 11/2001 | Hamamoto | F02D 13/0273 123/90.11 |
| 6,807,937 B2 | 10/2004 | Gianolio et al. | |
| 7,302,939 B2 | 12/2007 | Hill et al. | |
| 7,793,638 B2 | 9/2010 | Sturman | |
| 9,970,338 B2 | 5/2018 | Foster et al. | |
| 10,018,123 B1 | 7/2018 | Ulrey et al. | |
| 10,731,590 B2 | 8/2020 | Inoue et al. | |
| 2003/0154711 A1 | 8/2003 | Hayman et al. | |
| 2005/0000478 A1* | 1/2005 | Kuo | F02D 13/0215 123/90.15 |
| 2006/0016421 A1* | 1/2006 | Kuo | F02D 13/0273 123/316 |

* cited by examiner

*Primary Examiner* — John Kwon
*Assistant Examiner* — Johnny H Hoang
(74) *Attorney, Agent, or Firm* — Vincent Mastrogiacomo; McCoy Russell LLP

(57) ABSTRACT

Methods and systems are provided for re-combustion of exhaust in a cylinder of a multi-cylinder engine in order to increase the temperature of the exhaust for enhancing catalytic conversion within the multi-cylinder engine. In one example, a method may include expelling combusted gases from the cylinder into an intake manifold via an intake valve during an exhaust stroke, in order to rebreathe in the combusted gases from the intake manifold via the intake valve in a subsequent intake stroke.

15 Claims, 13 Drawing Sheets

METHODS FOR RE-COMBUSTION IN ENGINES

FIELD

The present description relates generally to methods and systems for re-combusting exhaust gas in cylinders of an internal combustion engine via rebreathing and recompression.

BACKGROUND/SUMMARY

One method to increase the exhaust gas temperature in a low engine speed situation is to utilize cylinder deactivation and thus more rapidly heat an exhaust catalyst.

Cylinder deactivation may typically be enabled by leaving closed intake valves and exhaust valves of one or more cylinders of the multi-cylinder engine. This may allow the deactivated cylinders to compress and decompress the charge stored therein through piston motion, while increasing cylinder pressure of the active cylinders at low engine load and decreasing the amount of air used during combustion in the engine, thereby increasing a temperature of exhaust gas generated by operation of the engine.

One example approach for enhancing catalytic conversion is given by Hayman et al. in U.S. Pat. No. 10,078,280. Therein, Hayman utilizes the engine controller in order to optimize cam phasing, the air/fuel mixture, and the sparking angle in order to achieve light-off temperature more quickly for more efficient catalytic conversion. In particular, during engine operation, the cam phase of an active cylinder is adjusted via a cam phasing system which allows for independent manipulation of exhaust camshaft timing and intake camshaft timing such that the exhaust valve is maintained open at the beginning of the intake stroke, along with the intake valve opening during the intake stroke. This may allow rebreathing of exhaust gas, reducing hydrocarbon emissions and maximizing exhaust gas energy which is a function of exhaust gas temperature and flow. This is combined with direct air injection via a dedicated direct air injection system and delayed sparking in order to maintain a lean air-fuel mixture for stable combustion. Additionally, if the engine is operating at low load, this may be combined with deactivation of one or more cylinders of a multi-cylinder engine in order to hasten reaching the light-off temperature of the catalytic converter.

However, the inventors herein have recognized potential issues with such systems. As one example, cylinder deactivation may cause unwanted noise, vibration, and harshness (NVH), especially during low engine speed operation, when it may be most desirable, such as during idling or near idle speeds. As another example, maintaining the exhaust valve open while opening the intake valve during the intake stroke may introduce low vacuum at low engine speed, in addition to unwanted NVH during idling and reduced low-end power production. Additionally, the system of Hayman makes use of a dedicated direct air injection system, which may be used in coordination with a separate fuel injection system and cam phasing. Addition of hardware such as the air injector and associated control systems may increase engine design complexity.

In one example, the issues described above may be addressed by a method including opening an intake valve during an exhaust stroke to expel combusted gases into an intake manifold of the engine, and then rebreathing the combusted gases during an immediately subsequent intake stroke. In this way, through re-combustion of a previously combusted air-fuel mixture, the exhaust gas temperature may be increased to aid in more efficient catalytic conversion at low engine speed.

As an example, re-combustion of the previously combusted gases may be carried out in cylinders of an internal combustion engine via rebreathing and/or recompression. For rebreathing, the cycling of cylinders in the multi-cylinder engine may be alternated between a standard four-stroke cycle and rebreathing. Rebreathing may include rebreathing in and re-combusting the air-fuel mixture that was previously combusted in the cylinder. In a first example, a combusted air-fuel mixture may be expelled via the intake valve into the intake manifold during the exhaust stroke, and the previously combusted air-fuel mixture combined with air from the intake manifold may then be rebreathed through the intake valve in the immediately subsequent intake stroke for combustion. In a second example, the combusted air-fuel mixture may be expelled via the exhaust valve into the exhaust manifold during the exhaust stroke, and the combusted air-fuel mixture may then be rebreathed in by the exhaust valve in the immediately subsequent intake stroke for combustion. In a third example, the exhaust valve may be maintained partially open during exhaust stroke and the intake stroke. The exhaust valve being maintained partially open during the intake and exhaust strokes may allow for a mixture of the partially combusted air-fuel mixture from the previous combustion and exhaust gas from the exhaust manifold to be used for subsequent combustion. In a fourth example, the intake valve may be maintained partially open during exhaust stroke and the intake stroke. The intake valve being maintained partially open during the intake and exhaust strokes may allow for a mixture of the partially combusted air-fuel mixture from the previous combustion and air from the intake manifold to be used for subsequent combustion. The injection strategy for the re-combustion as part of the above rebreathing methods may be modified in order to reduce the possibility of a rich air-fuel mixture.

For recompression, two or three combustions events may be carried out to increase exhaust gas temperature. The cycling of cylinders in the multi-cylinder engine may alternate between a standard four-stroke cycle and recompression, which includes re-combustion without any rebreathing. Recompression may involve deactivating the cylinders (closing off the exhaust and intake valves) after a first combustion event in order to recompress the exhaust gas maintained in the cylinders. In particular, the recompression may include closing off the intake and exhaust valves during the exhaust and intake strokes, and recompressing previously combusted exhaust gas, which may then be subsequently re-combusted in a second combustion and expelled through the exhaust valve. The recompression may also optionally involve an additional intermediate combustion before the second combustion mentioned previously, totaling three combustions throughout recompression. The injection strategy for the re-combustion as part of recompression may be modified in order to reduce the possibility of a rich air-fuel mixture. Additionally, in some examples, the recompression routine may switch to rebreathing, for example in order to reduce NVH during cylinder operation.

In this way, through re-combustion of the previously combusted air-fuel mixture in the cylinders of the multi-cylinder engine, the exhaust gas temperature during engine operation may be increased, leading to more efficient catalytic conversion for reduced emissions. The technical effect of re-combustion of the previously combusted air-fuel mixture either through rebreathing or recompression is to reduce air flow through the engine. The reduction of air flow through the engine may lead to greater exhaust gas temperatures during engine operation. Re-combustion of the previously combusted air-fuel mixture may be used to attain the desired exhaust temperature without the added NVH issues associated with other methods such as cylinder deactivation. Overall, by using rebreathing or recompression in engine cylinders, catalyst operation may be maintained above the light-off temperature and emissions quality may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
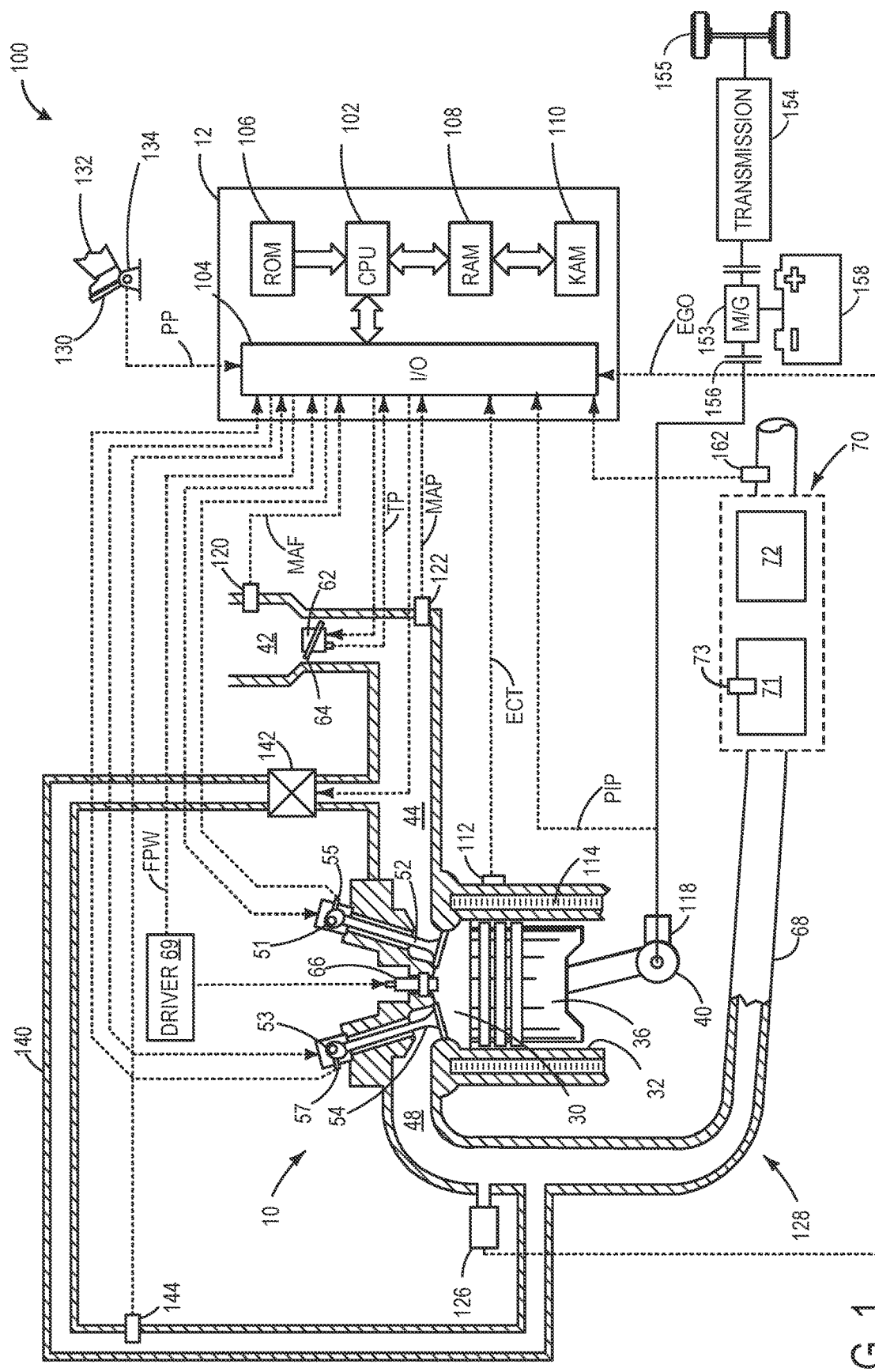
FIG. 1 shows a schematic diagram of an engine.
Figure 2:
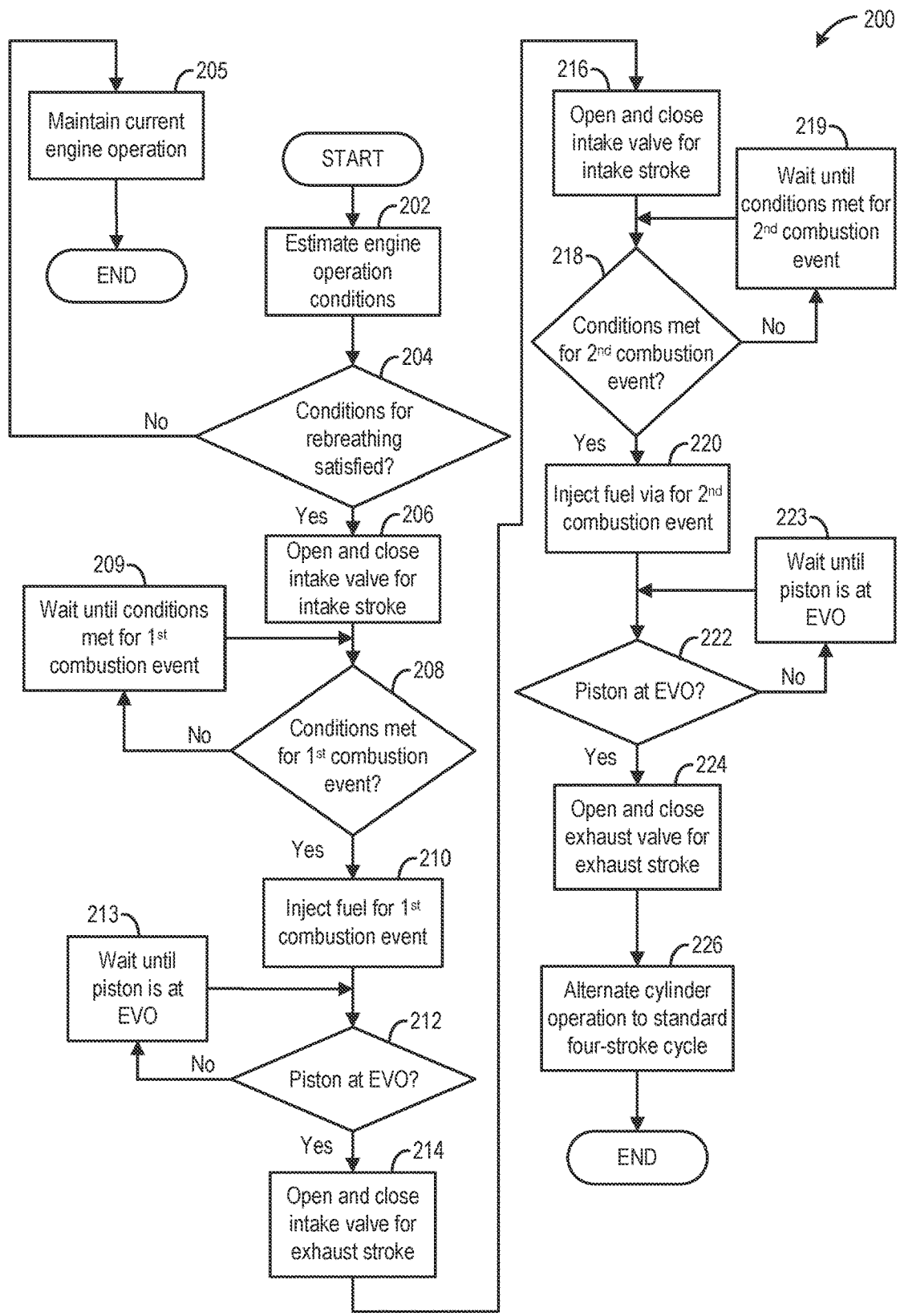
FIG. 2 shows a flowchart for a first example method for rebreathing an exhaust gas/air mixture from an intake manifold via an intake valve during an exhaust stroke of a piston in a cylinder.

The following description relates to methods for re-combustion of exhaust in a multi-cylinder combustion engine in order to increase exhaust temperature for catalytic conversion during low engine speed conditions. The methods may employ cylinders of a multi-cylinder engine, as depicted in FIG. 1, in order to re-combust (either through rebreathing or recompression) previously combusted exhaust gas to increase exhaust temperature. In particular, a first example method for rebreathing may activate the intake valve during an exhaust stroke of an engine cycle, and then rebreathe an air/exhaust mixture via subsequent activation of the intake valve during the intake stroke, as depicted in FIG. 2. Alternatively, the exhaust valve can be activated during both the exhaust stroke and the intake stroke for rebreathing in exhaust, as depicted in a second example method for rebreathing in FIG. 3. Rebreathing may also be utilized by maintaining the exhaust valve partially open in the exhaust and intake strokes, as shown in a third example method for rebreathing in FIG. 4, or through maintaining the intake valve partially open in the exhaust and intake strokes, as shown in a fourth example method for rebreathing in FIG. 5. Corresponding to the example embodiments of FIGS. 2-5 are timing charts showing valve actuation within two engine cycles, which are depicted in FIGS. 6-9.

Figure 10:
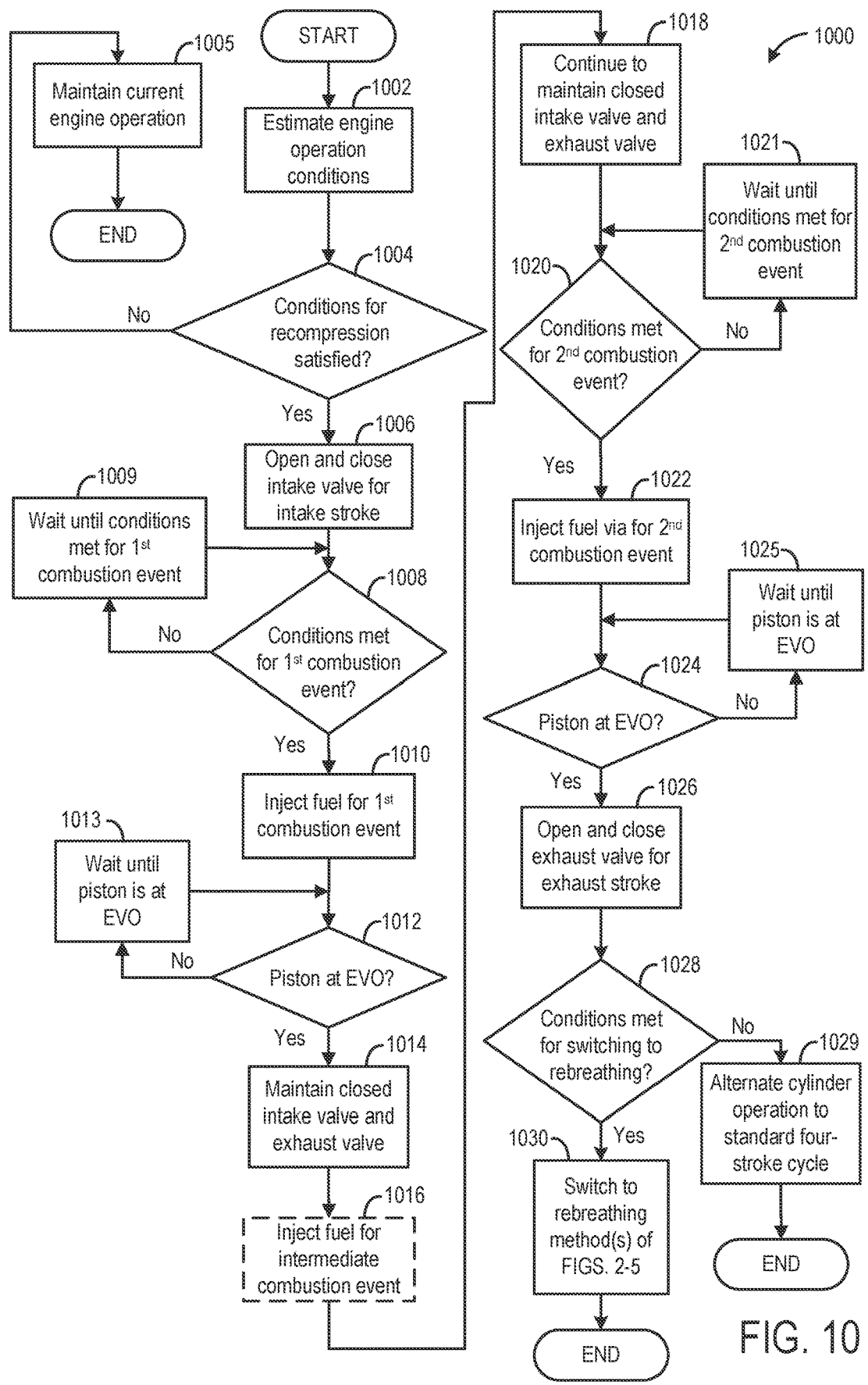
FIG. 10 shows a flowchart of an example method for recompression of combustion mixture by cyclically deactivating a cylinder or cylinders in conjunction with one or more additional fuel injection events of the deactivated cylinders.

Exhaust can be further reused via recompression by periodically deactivating the cylinders of the multi-cylinder engine. An example method for recompression of exhaust in a cylinder, including one or more additional combustion events, is shown in FIG. 10, with timing charts shown in FIGS. 11 and 12 to illustrate recompression and a typical firing sequence for an 8 cylinder engine, respectively. The firing sequence may be modified with the addition of exhaust recompression via periodic deactivation of cylinders, such a modification of the typical firing sequence is given in FIG. 13.

FIG. 1 shows a schematic diagram with one cylinder of multi-cylinder engine 10, which may be included in a propulsion system of a vehicle 100. Engine 10 may be controlled at least partially by a control system including a controller 12 and by input from a vehicle operator 132 via an input device 130. In this example, input device 130 includes an accelerator pedal and a pedal position sensor 134 for generating a proportional pedal position signal PP. A combustion chamber 30 (also termed, cylinder 30) of the engine 10 may include combustion chamber walls 32 with a piston 36 positioned therein. Piston 36 may be coupled to a crankshaft 40 so that reciprocating motion of the piston is translated into rotational motion of the crankshaft. Crankshaft 40 may be coupled to at least one drive wheel of a vehicle via a transmission 154. Further, a starter motor may be coupled to the crankshaft 40 via a flywheel (not shown) to enable a starting operation of the engine 10.

Cylinder 30 may receive intake air from an intake manifold 44 via an intake passage 42 and may exhaust combustion gases via an exhaust manifold 48 to exhaust passage 68. The intake manifold 44 and the exhaust manifold 48 can selectively communicate with the cylinder 30 via intake valve 52 and exhaust valve 54 respectively. In some embodiments, the cylinder 30 may include two or more intake valves and/or two or more exhaust valves.

In the example depicted in FIG. 1, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 52 and the exhaust valve 54 may be determined by position sensors 55 and 57, respectively. In alternative embodiments, the intake valve 52 and/or exhaust valve 54 may be controlled by electric valve actuation. For example, the cylinder 30 may alternatively include an intake valve controlled via electric valve actuation and an exhaust valve controlled via cam actuation including CPS and/or VCT systems.

In some embodiments, each cylinder of the engine 10 may be configured with one or more fuel injectors for providing fuel thereto. As a non-limiting example, the cylinder 30 is shown including one fuel injector 66. Fuel injector 66 is shown coupled to the cylinder 30 for injecting fuel directly therein in proportion to the pulse width of signal FPW received from controller 12 via electronic driver 69. In this manner, fuel injector 66 provides what is known as direct injection of fuel into cylinder 30. It will also be appreciated that the cylinder 30 may receive fuel from a plurality of injections during a combustion cycle. In other examples, the fuel injector may be mounted in the side of the combustion chamber or in the top of the combustion chamber, for example. Fuel may be delivered to fuel injector 66 by a fuel system (not shown) including a fuel tank, a fuel pump, and a fuel rail.

In one example, the engine 10 may be a diesel engine that combusts air and diesel fuel through compression ignition. In other non-limiting embodiments, the engine 10 may combust a different fuel including gasoline, biodiesel, or an alcohol containing fuel blend (e.g., gasoline and ethanol or gasoline and methanol) through compression ignition and/or spark ignition. Thus, the embodiments described herein may be used in any suitable engine, including but not limited to, diesel and gasoline compression ignition engines, spark ignition engines, direct or port injection engines, etc.

The intake passage 42 may include a throttle 62 having a throttle plate 64. In this particular example, the position of the throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the cylinder 30 among other engine cylinders. The position of the throttle plate 64 may be provided to the controller 12 by throttle position signal TP. The intake passage 42 may include a mass air flow (MAF) sensor 120 and a manifold air pressure (MAP) sensor 122 for providing respective signals MAF and MAP to the controller 12.

Further, in the disclosed embodiments, an exhaust gas recirculation (EGR) system may route a desired portion of exhaust gas from the exhaust passage 68 to the intake manifold 44 via an EGR passage 140. The amount of EGR provided may be varied by controller 12 via an EGR valve 142. By introducing exhaust gas to the engine 10, the amount of available oxygen for combustion is decreased, thereby reducing combustion flame temperatures and reducing the formation of $NO_R$, for example. As depicted, the EGR system further includes an EGR sensor 144 which may be arranged within the EGR passage 140 and may provide an indication of one or more of pressure, temperature, and concentration of the exhaust gas. Under some conditions, the EGR system may be used to regulate the temperature of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing, such as by controlling a variable valve timing mechanism.

An exhaust system 128 includes an exhaust gas sensor 126 coupled to the exhaust manifold 48 upstream of an emission control system 70. Exhaust gas sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), NOx, HC, or CO sensor.

Emission control system 70 is shown arranged along exhaust passage 68 downstream of exhaust gas sensor 126. Emission control system 70 may be a selective catalytic reduction (SCR) system, three-way catalyst (TWC), $NO_R$ trap, various other emission control devices, or combinations thereof. For example, emission control system 70 may include an SCR catalyst 71 and a diesel particulate filter (DPF) 72. In some embodiments, DPF 72 may be located downstream of the SCR catalyst 71 (as shown in FIG. 1), while in other embodiments, DPF 72 may be positioned upstream of the SCR catalyst 71 (not shown in FIG. 1). SCR catalyst 71 may contain an SCR catalyst sensor 73. SCR catalyst sensor 73 may be arranged within SCR catalyst 71 and may indicate one or more of an intake temperature, an outlet temperature, and $NO_R$ quantity of the exhaust gas at the outlet of the SCR catalyst 71. Emission control system 70 may further include exhaust gas sensor 162. Exhaust gas sensor 162 may be any suitable sensor for providing an indication of a concentration of exhaust gas constituents such as a $NO_x$, $NH_3$, etc. and may be an EGO or particulate matter (PM) sensor, for example. In some embodiments exhaust gas sensor 162 may be located downstream of DPF 72 (as shown in FIG. 1), while in other embodiments, exhaust gas sensor 162 may be positioned upstream of DPF 72 (not shown in FIG. 1). Further, it will be appreciated that more than one exhaust gas sensor 162 may be provided in any suitable position.

Emission control system 70 may be considered operating efficiently at a light-off temperature. A light-off temperature of the emission control system 70 is a temperature at which the catalytic conversion of exhaust fumes within the emission control system 70 converts at a rate of 50%. For example, under low engine speed operation with a four-stroke cycle, the emission control system 70 may not be able to reach the light-off temperature, increasing emissions from the vehicle 100 beyond an acceptable value. By increasing the temperature of the exhaust entering the exhaust passage 68 to above the light-off temperature, the emission control system 70 may operate more efficiently, reducing emissions of the vehicle 100.

The light-off temperature may be achieved by altering the standard four-stroke cycle via rebreathing. In one example, rebreathing may be implemented in the multi-cylinder engine 10 via opening the intake valve 52 instead of the exhaust valve 54 during an exhaust stroke in order to expel combusted gases into the intake manifold 44 of the engine 10. After the aforementioned expulsion of combusted gases from the cylinder 30, the combusted gases may be rebreathed during an immediately subsequent intake stroke. In particular, opening of the intake valve 52 instead of the exhaust valve 54 may include fully opening the intake valve 52 during a first exhaust stroke following a first intake stroke, a first compression stroke, and a first combustion event, and a first expansion stroke, closing the intake valve 52 at an end of the first exhaust stroke, and then reopening the intake valve 52 during a second intake stroke immediately subsequent to the first exhaust stroke to rebreathe the combusted gases from the intake manifold 44. Following the rebreathing of the combusted gases from the intake manifold 44, the intake valve may again be closed at an end of the second intake stroke, allowing for the combusted gases to be compressed, further combusted in a second combustion, after which the exhaust valve 54 may be opened during a second exhaust stroke.

Fuel injection during the rebreathing method described above may include injecting a first amount of fuel during a first injection immediately prior to the first combustion event and a second amount of fuel during a second injection immediately prior to the second combustion event. A first timing for the first injection may be retarded from TDC to maintain $NO_x$ concentrations and reduce NVH, and a second injection timing for the second injection may be advanced from TDC in order to reduce rich operation of the cylinder 30. In particular, the first injection may include a first number of pilot fuel injections to inject the first amount of fuel and the second injection includes a second number of pilot injections to inject a second amount of fuel, where the first number of pilot injections is greater than the second number of pilot injections, and the first amount of fuel is greater than the second amount of fuel. Additionally, in order to reduce rich operation of the cylinder 30, a closing time of the intake valve 52 during the second intake stroke may be advanced from the end of the second intake stroke.

Controller 12 is shown in FIG. 1 as a microcomputer, including a microprocessor unit 102, input/output ports 104, an electronic storage medium for executable programs and calibration values shown as a read-only memory chip 106 in this particular example, random access memory 108, keep alive memory 110, and a data bus. The controller 12 may be in communication with and, therefore, receive various signals from sensors coupled to the engine 10, in addition to those signals previously discussed, including measurement of inducted mass air flow (MAF) from the MAF sensor 120; engine coolant temperature (ECT) from a temperature sensor 112 coupled to a cooling sleeve 114; a profile ignition pickup signal (PIP) from a Hall effect sensor 118 (or other type) coupled to the crankshaft 40; throttle position (TP) from a throttle position sensor; absolute manifold pressure signal, MAP, from the MAP sensor 122; and exhaust constituent concentration from the exhaust gas sensors 126 and 162. Engine speed signal, RPM, may be generated by controller 12 from signal PIP. Note that various combinations of the above sensors may be used, such as a MAF sensor without a MAP sensor, or vice versa. During stoichiometric operation, this sensor can give an indication of engine torque. Further, this sensor, along with engine speed, can provide an estimate of charge (including air) inducted into the cylinder. In one example, Hall effect sensor 118, which is also used as an engine speed sensor, produces a predetermined number of equally spaced pulses each revolution of the crankshaft.

In addition to the above sensors, a combustion sensor (not shown) may be coupled to an individual cylinder on a per cylinder basis. The combustion sensor may be an appropriate sensor as known in the art for example a knock sensor, a vibration sensor, a temperature sensor, a pressure sensor, etc. or any combination thereof. The combustion sensor may sense combustion relevant parameters such as a peak pressure value, the location of a peak pressure, the timing of a peak pressure, or any combination thereof, for example.

The storage medium read-only memory chip 106 can be programmed with non-transitory, computer readable data representing instructions executable by the microprocessor unit 102 for performing the routines described below as well as other variants that are anticipated but not specifically listed. Example routines for operation of rebreathing and recompression as methods for re-combustion of fuel within one or more cylinders 30 are described herein with reference to FIGS. 2-5, 10.

In some examples, vehicle 100 may be a hybrid vehicle with multiple sources of torque available to one or more vehicle wheels 155. In other examples, vehicle 100 is a conventional vehicle with only an engine, or an electric vehicle with only electric machine(s). In the example shown, vehicle 100 includes engine 10 and an electric machine 152. Electric machine 152 may be a motor or a motor/generator. Crankshaft 40 of engine 10 and electric machine 152 are connected via a transmission 154 to vehicle wheels 155 when one or more clutches 156 are engaged. In the depicted example, a first clutch 156 is provided between crankshaft 40 and electric machine 152, and a second clutch 156 is provided between electric machine 152 and transmission 154. Controller 12 may send a signal to an actuator of each clutch 156 to engage or disengage the clutch, so as to connect or disconnect crankshaft 40 from electric machine 152 and the components connected thereto, and/or connect or disconnect electric machine 152 from transmission 154 and the components connected thereto. Transmission 154 may be a gearbox, a planetary gear system, or another type of transmission. The powertrain may be configured in various manners including as a parallel, a series, or a series-parallel hybrid vehicle.

Electric machine 152 receives electrical power from a traction battery 158 to provide torque to vehicle wheels 155. Electric machine 152 may also be operated as a generator to provide electrical power to charge battery 158, for example during a braking operation.

As described above, FIG. 1 shows one cylinder 30 of a multi-cylinder engine 10, and each cylinder may similarly include its own set of intake/exhaust valves, fuel injector, etc. During operation of the cylinders of the multi-cylinder engine 10, one or more of the cylinders of the multi-cylinder engine 10 may be deactivated, in order to maintain efficiency in engine operation. In one example, cylinder deactivation may be applied during low engine speed operation in order to maintain fuel efficiency. In another example, cylinders may be cyclically activated and deactivated via cam actuation systems 51 and 53, such as during recompression, in order to allow for re-combustion of gases maintained in the cylinders for purposes of increasing the exhaust temperature.

In this way, the system of FIG. 1 may utilize recompression in order to achieve a light-off temperature. In particular, controller 12 may be configured to selectively deactivate cylinder 30 by closing the intake valve 52 and exhaust valve 54 of the cylinder 30 for alternating engine cycles in response to an exhaust catalyst (such as SCR catalyst 71) decreasing below a threshold temperature. Upon closing the intake valve 52 and the exhaust valve 54, the controller 12 may actuate fuel injection into the cylinder 30 one or more times for recompression and re-combustion of trapped gases in the cylinder 30. Selective deactivation of the cylinder 30 for alternating engine cycles further includes opening the intake valve 52 during a first intake stroke for a first cycle, combusting air and fuel in the cylinder 30 for a first time, deactivating the exhaust valve 54 to trap gases in the cylinder 30, and then compressing and expanding the trapped gases in the cylinder 30 twice before opening the exhaust valve 54. Fuel injection into the cylinder 30 further includes injecting fuel for a first injection event at an end of a first compression stroke of the first cycle, combusting the air and fuel for the first time immediately after the first injection event, injecting fuel for a second injection event at an end of a second compression stroke of a second cycle, combusting the trapped gases for a second time immediately after the second injection event, and then opening the exhaust valve 54. Recompression is described in further detail in relation to FIGS. 10-11.

FIG. 2 shows a first method 200 for rebreathing in a previously combusted air-fuel mixture from an intake manifold (such as intake manifold 44 of FIG. 1) via an intake valve (such as intake valve 52 of FIG. 1) of a multi-cylinder engine (such as engine 10 of FIG. 1) of a vehicle (such as vehicle 100 of FIG. 1). Method 200 and all other methods described herein will be described in reference to the systems described herein and with regard to FIG. 1, but it should be understood that similar methods may be applied to other systems without departing from the scope of this disclosure. Method 200 and all other methods described herein may be carried out by a control system (e.g., controller 12), and may be stored at controller 12 in non-transitory memory. Instructions for carrying out method 200 and all other method described herein may be executed by the controller 12 in conjunction with signals received from sensors of an engine system of the vehicle, such as the sensors described above with reference to FIG. 1. The controller may employ engine actuators of the engine system to adjust operation of an engine of the vehicle, according to the methods described below.

At 202, method 200 may estimate engine operating conditions. Estimating engine operating conditions may involve estimating the engine load and engine speed. As explained in relation to FIG. 1, a profile ignition pickup signal (PIP) from a sensor (such as Hall effect sensor 118 of FIG. 1) coupled to the crankshaft (such as crankshaft 40 of FIG. 1) may be used to determine the engine speed or RPM of the engine. Engine load may be determined through air flow measurements via a including a MAF sensor (such as MAF sensor 120 of FIG. 1). Properties of the exhaust gas upstream of an emission control system (such as emission control system 70 of FIG. 1), such as the exhaust gas air/fuel ratio may be determined via an exhaust gas sensor (such as exhaust gas sensor 126 and/or exhaust gas sensor 162 of FIG. 1). Additionally, the temperature of the exhaust gas within an SCR catalyst (such as SCR catalyst 71 of FIG. 1) may be determined via an SCR sensor (such as SCR catalyst sensor 73 of FIG. 1) or an exhaust temperature sensor in order to determine if the SCR catalyst is operating at a sufficiently high temperature for effective catalytic reaction. Further ambient conditions such as ambient temperature and humidity may be estimated.

At 204, method 200 may determine if conditions for initiating rebreathing are satisfied. Rebreathing may involve expelling the combusted air-fuel mixture from a cylinder (such as cylinder 30 of FIG. 1) in an exhaust stroke after a first combustion event, in order to rebreathe the combusted air-fuel mixture in the immediately subsequent intake stroke of a piston (such as piston 36 of FIG. 1) for a second combustion event. In this example, immediately subsequent rebreathing may correspond to beginning to open an intake valve (such as intake valve 52 of FIG. 1) after a displacement in crankshaft angle degrees of at most 5-10 following the exhaust stroke. In one example, rebreathing may operate on a subset of the total number of cylinders, for example half of the cylinders in the engine. In another example, rebreathing may operate on all of the cylinders in the engine. The conditions for initiating rebreathing may include the engine speed being below a threshold engine speed. For example, the threshold engine speed may be set as the idling speed, or at a near idling speed. As an example, the threshold speed may be in the range of 600-1000 RPM. Alternatively, rebreathing may be initiated throughout the engine speed range. The conditions for initiating rebreathing may also include the temperature of an exhaust catalyst being below a threshold temperature. As an example, the threshold temperature may be set as the light off temperature, which is the temperature at which catalysis operates at 50% efficiency. If the exhaust catalyst is below the threshold temperature, rebreathing may be initiated in order to increase the exhaust gas temperature for more efficient operation of the SCR catalyst. If the conditions for rebreathing are not satisfied, method 200 may proceed to 205 to maintain current engine operating conditions. For example, the current engine operating conditions may include opening the intake valve during the intake stroke, with the exhaust valve closed, and opening the exhaust valve during the exhaust stroke, with the intake valve closed. After returning to maintaining current engine operations, the method may end.

If it is determined that conditions are met for rebreathing of the engine cylinders, at 206, method 200 may open and close the intake valve to intake air from the intake manifold during an intake stroke of the piston. The intake valve may be actuated to open to a fully open position and close to a fully closed position during the motion of the piston from top dead center (TDC) to bottom dead center (BDC). A fully open position may correspond to a maximum valve lift of the intake valve. In particular, the intake valve may begin to open when the piston is at TDC, reach a fully open position when the piston is halfway between TDC and BDC, and reach a fully closed position as the piston reaches BDC. As mentioned in relation to FIG. 1, the intake valve may be actuated by a cam actuation system (such as cam actuation system 51 of FIG. 1) in one embodiment, or by electronic valve actuation. Opening and closing of the intake valve during the intake stroke may allow air from the intake manifold to flow into the cylinder, as a vacuum is generated within the cylinder due to the motion of the piston from TDC to BDC. In addition to intake air, exhaust gas from the exhaust gas recirculation (EGR) system provided by an EGR passage (such as EGR passage 140 of FIG. 1) into the intake manifold may also flow from the intake manifold into the cylinder due to the vacuum generated therein.

At 208, method 200 may then determine if the conditions for a first combustion event are met. In one example, the condition for a first combustion event may be that the piston is at the TDC position at the end of a compression stroke to allow for a main injection of fuel via a fuel injector (such as fuel injector 66 of FIG. 1). In another example, the condition for a first combustion event may be that the piston is at an intermediate state between BDC and the TDC position of the compression stroke in order to allow for pilot injection of fuel into the cylinder via a fuel injector (such as fuel injector 66 of FIG. 1) prior to a main fuel injection via the fuel injector. In one example, the injection timing of both the pilot injections and the main injection may be retarded from the piston reaching TDC in order to maintain $NO_x$ levels and lower noise. In another example, pilot injection may also be altered by increasing the number of pilots and increasing the amount of fuel injected via pilot injection to maintain lower noise during conditions when a lower level of exhaust gas recirculation (EGR) is provided to the cylinder(s). The position of the piston may be determined by a crankshaft position sensor. If the conditions for a first combustion event are not met, then method 200 may proceed to 209 to wait until conditions are met for the first combustion event, and then may return to 208.

At 210, method 200 may inject fuel for the first combustion event. The injection of fuel for the first combustion event may include fuel injection via one or more pilot injections followed by fuel injection via direct injection. Upon injection of the fuel into the cylinder via the fuel injector, in one example, the fuel may be combusted via spark ignition upon the piston reaching TDC. In another embodiment, the fuel in the cylinder may be ignited via compression ignition. Combustion of the gases in the cylinder may then force the piston downwards, as part of the combustion stroke of the piston.

At 212, method 200 may determine if the piston is in a position corresponding to exhaust valve opening (EVO). EVO may correspond to a point in a standard four-stroke engine cycle at which the exhaust valve is opened, prior to the beginning of a subsequent exhaust stroke of the piston, which may begin when the piston reaches BDC. In one example, EVO may be determined by the estimating if the piston position corresponds to the piston position at EVO for a standard four-stroke engine cycle. A piston position corresponding to EVO for a standard four-stroke cycle may be stored in the non-transitory memory of the controller, and the piston position may be estimated by the crankshaft position sensor, and compared to the value stored in the non-transitory memory of the controller. If the piston is not at the position corresponding to EVO for a standard four-stroke cycle, then method 200 may proceed to 213 to wait until the piston is at EVO, and then return to 212. If the piston is at EVO, method 200 proceeds to 214.

At 214, method 200 may open and close the intake valve for the exhaust stroke. During the exhaust stroke, the piston may shift from BDC to TDC, pushing the combusted air-fuel mixture into the intake manifold via the open intake valve. In conjunction with the motion of the piston, the intake valve may be actuated from a fully closed position when the piston is in BDC, to a fully open position when the piston is halfway between BDC and TDC, and back to a fully closed position as the piston reaches TDC. A fully open position may correspond to a maximum valve lift of the intake valve. In conjunction with the opening and closing of the intake valve, an exhaust valve (such as exhaust valve 54 of FIG. 1) may be maintained in a closed position throughout the exhaust stroke. In another example, the exhaust valve may also be opened as the piston moves from BDC to TDC via unmodified operation of an exhaust valve cam actuation system (such as cam actuation system 53 of FIG. 1), such that the exhaust valve may be actuated from a fully closed position when the piston is in BDC, to a fully open position when the piston is halfway between BDC and TDC, and back to a fully closed position as the piston reaches TDC. In one embodiment, the intake valve may be actuated by the cam actuation system, which may employ variable valve timing (VVT) via the controller. Additionally, the exhaust valve may also utilize a cam actuation system (such as cam actuation system 53 of FIG. 1) in order to maintain the exhaust valve in the closed position via VVT as commanded by the controller.

At 216, method 200 may once again open and close the intake valve for the intake stroke. The intake valve may be opened and closed as the piston moves from TDC to BDC. As the piston moves from TDC to BDC, a vacuum is created in the cylinder, drawing in a mixture of air from the intake manifold, exhaust gas from the EGR system, and the previously combusted air-fuel mixture evacuated from the cylinder during the exhaust phase, which may then be utilized for a second combustion event. In conjunction with the motion of the piston, the intake valve may be actuated from a fully closed position when the piston is in TDC, to a fully open position when the piston is halfway between TDC and BDC, and back to a fully closed position as the piston reaches BDC. A fully open position may correspond to a maximum valve lift of the intake valve. In one example, the intake valve closing prior to the second combustion event may be advanced with respect to the piston reaching TDC in order to reduce rich operation of the engine combustion.

At 218, method 200 may determine if the conditions are met for a second combustion event. In one example, the condition for a second combustion event may include that the piston is at TDC to allow for a main injection of fuel via a fuel injector. However, the conditions for the second combustion event may be different than the conditions for the first combustion event, owing to the difference in the composition of the intake gas entering the cylinder during the respective intake strokes. In particular, due to the mixture of combusted gases with intake air, the concentration of oxygen may be reduced, consequently, the injection timing may be advanced with respect to the piston reaching TDC in order to avoid rich operation. In another example, due to the already rich gases in the cylinder, the condition for a second combustion event may be that the piston is at an intermediate state between BDC and TDC in order to allow for pilot injection prior to a direct injection. However, the intermediate state of this example may differ from the intermediate state of the example of 208, in that it may be closer to TDC than the intermediate state of 208, to allow for advanced timing of pilot injection. The position of the piston may be determined by the crankshaft position sensor. If the conditions for a second combustion event are not met, then method 200 may proceed to 219 to wait until conditions are met for the first combustion event, and then may return to 218.

At 220, method 200 may inject fuel for the second combustion event. As mentioned in 218, the injection of both pilot injection and a main injection for the first combustion event may be advanced with respect to the piston reaching TDC in order to reduce the possibility of rich operation, and the quantity of pilot injection fuel may be reduced. Upon injection of the fuel into the cylinder via the fuel injector, in one embodiment, the fuel may be combusted via spark ignition upon the piston reaching TDC. In another embodiment, the fuel in the cylinder may be ignited via compression ignition. Combustion of the gases in the cylinder may then force the piston downwards, as part of the combustion stroke of the piston.

At 222, method 200 may determine if the piston is in a position corresponding to exhaust valve opening (EVO). EVO may correspond to a point in a standard four-stroke engine cycle at which the exhaust valve is opened, prior to the beginning of a subsequent exhaust stroke of the piston, which may begin when the piston reaches BDC. In one example, EVO may be determined by the estimating if the piston position corresponds to the piston position at EVO for a standard four-stroke engine cycle. A piston position corresponding to EVO for a standard four-stroke cycle may be stored in the non-transitory memory of the controller, and the piston position may be estimated by the crankshaft position sensor, and compared to the value stored in the non-transitory memory of the controller. If the piston is not at the position corresponding to EVO for a standard four-stroke cycle, then method 200 may proceed to 223 to wait until the piston is at EVO, and then return to 222. If the piston is at EVO, method 200 proceeds to 224.

At 224, method 200 may open and close an exhaust valve (such as exhaust valve 54 of FIG. 1) for the exhaust stroke.

The exhaust valve may be opened and closed via a cam actuation system. During the exhaust stroke, the piston may shift from BDC to TDC, pushing the combusted air-fuel mixture into an exhaust manifold (such as exhaust manifold 48 of FIG. 1) via the open exhaust valve, which may then be routed through an emission control system (such as emission control system 70 of FIG. 1) and a turbine (not shown). With the opening and closing of the exhaust valve in conjunction with the exhaust stroke, rebreathing may end, and method 200 may proceed to 226 to alternate cylinder operation to a standard four-stroke cycle, in which intake air (including EGR) is routed into the cylinder during the intake stroke via the intake valve, and exhaust gas is routed into the exhaust manifold during the exhaust stroke via the exhaust valve. Alternating cylinder operation may include performing a four-stroke cycle, and then returning to performing rebreathing, in a cyclic manner. Method 200 may then end.

Figure 3:
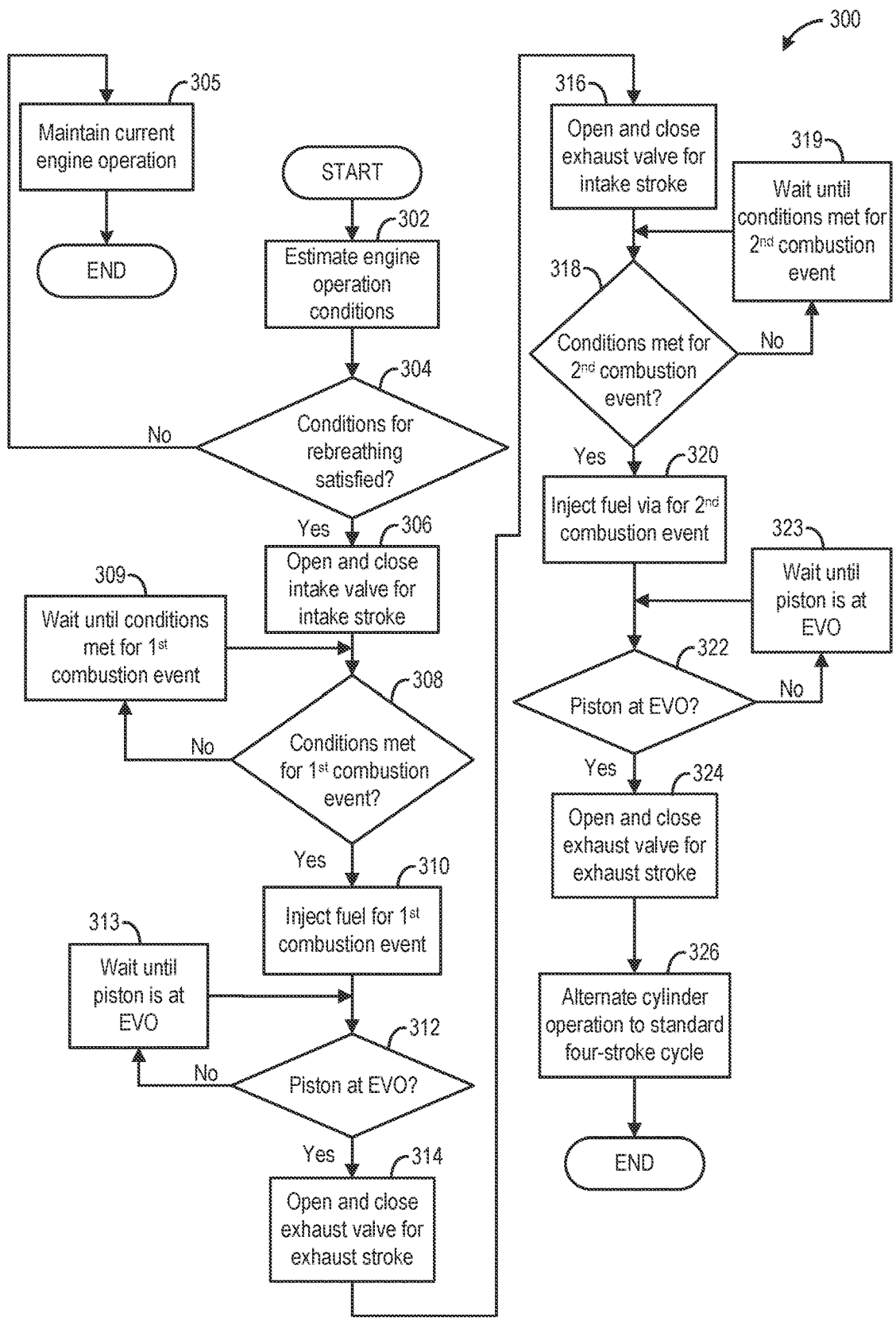
FIG. 3 shows a flowchart for a second example method for rebreathing exhaust gas from an exhaust manifold via an exhaust valve during the exhaust stroke of the piston in the cylinder.

FIG. 3 shows a second method 300 for rebreathing an air/exhaust gas mixture from an exhaust manifold (such as exhaust manifold 48 of FIG. 1) via an exhaust valve (such as exhaust valve 54 of FIG. 1) of a multi-cylinder engine (such as engine 10 of FIG. 1) of a vehicle (such as vehicle 100 of FIG. 1).

At 302, method 300 may estimate engine operating conditions. Estimating engine operating conditions may involve estimating the engine load and engine speed. As explained in relation to FIG. 1, a profile ignition pickup signal (PIP) from a sensor (such as Hall effect sensor 118 of FIG. 1) coupled to the crankshaft (such as crankshaft 40 of FIG. 1) may be used to determine the engine speed or RPM of the engine. Engine load may be determined through air flow measurements via a including a MAF sensor (such as MAF sensor 120 of FIG. 1). Properties of the exhaust gas upstream of an emission control system (such as emission control system 70 of FIG. 1), such as the exhaust gas air/fuel ratio may be determined via an exhaust gas sensor (such as exhaust gas sensor 126 and/or exhaust gas sensor 162 of FIG. 1). Additionally, the temperature of the exhaust gas within an SCR catalyst (such as SCR catalyst 71 of FIG. 1) may be determined via an SCR sensor (such as SCR catalyst sensor 73 of FIG. 1) or an exhaust temperature sensor in order to determine if the SCR catalyst is operating at a sufficiently high temperature for effective catalytic reaction. Further ambient conditions such as ambient temperature and humidity may be estimated.

At 304, method 300 may determine if conditions for initiating rebreathing are satisfied. Rebreathing may involve expelling exhaust gas from a cylinder (such as cylinder 30 of FIG. 1) after a first combustion event, in order to rebreathe the combusted air-fuel mixture in the immediately subsequent intake stroke of a piston (such as piston 36 of FIG. 1) for a second combustion event. In this example, immediately subsequent rebreathing may correspond to beginning to open the exhaust valve after a displacement in crankshaft angle degrees of at most 5-10 following the exhaust stroke. The conditions for initiating rebreathing may include in one example determining if the engine speed is below a threshold engine speed. For example, the threshold engine speed may be set as the idling speed, or at a near idling speed. As an example, the threshold speed may be one value in the range of 600-1000 RPM. Alternatively, rebreathing may be initiated throughout the engine speed range. The conditions for initiating rebreathing may also include determining if the SCR catalyst is operating below a threshold temperature. As an example, the threshold temperature may be set as the light off temperature, which is the temperature at which catalysis operates at 50% efficiency. If the SCR catalyst is below the threshold temperature, rebreathing may be initiated in order to increase the exhaust gas temperature for more efficient operation of the SCR catalyst. If the conditions for rebreathing are not satisfied, method 300 may proceed to 305 to maintain current engine operating conditions. For example, the current engine operating conditions may include opening the intake valve during the intake stroke, with the exhaust valve closed, and opening the exhaust valve during the exhaust stroke, with the intake valve closed. After returning to maintaining current engine operations, the method may end.

If it is determined that conditions are met for rebreathing of the engine cylinders, at 306, method 300 may open and close an intake valve (such as intake valve 52 of FIG. 1) to intake air from the intake manifold during an intake stroke of the piston. The intake valve may be actuated to open to a fully open position and close to a fully closed position during the motion of the piston from top dead center (TDC) to bottom dead center (BDC). In conjunction with the motion of the piston, the intake valve may be actuated from a fully closed position when the piston is in TDC, to a fully open position when the piston is halfway between TDC and BDC, and back to a fully closed position as the piston reaches BDC. A fully open position may correspond to a maximum valve lift of the intake valve. As mentioned in relation to FIG. 1, the intake valve may be actuated by a cam actuation system (such as cam actuation system 51 of FIG. 1) in one embodiment, or by electronic valve actuation. Opening and closing of the intake valve during the intake stroke may allow air from the intake manifold to flow into the cylinder, in which a vacuum is generated due to the motion of the piston from TDC to BDC. In addition to intake air, exhaust gas from the exhaust gas recirculation (EGR) system provided by an EGR passage (such as EGR passage 140 of FIG. 1) into the intake manifold may also flow from the intake manifold into the cylinder due to the vacuum generated therein.

At 308, method 300 may then determine if the conditions for a first combustion event are met. In one example, the condition for a first combustion event may be that the piston is at TDC to allow for a main injection of fuel via a fuel injector (such as fuel injector 66 of FIG. 1). In another example, the condition for a first combustion event may be that the piston is at an intermediate state between BDC and TDC during the compression stroke in order to allow for pilot injection of fuel vapor into the cylinder via a fuel injector (such as fuel injector 66 of FIG. 1), in addition to a main injection of fuel via the fuel injector. In one example, the injection timing of both the pilot injections and the main injection may be retarded from the piston reaching TDC in order to maintain $NO_x$ levels and lower noise. In another example, pilot injection may also be altered by increasing the number of pilots and increasing the amount of fuel injected via pilot injection to maintain lower noise during conditions when a lower level of exhaust gas recirculation (EGR) is provided to the cylinder(s). The position of the piston may be determined by a crankshaft position sensor. If the conditions for a first combustion event are not met, then method 300 may proceed to 309 to wait until conditions are met for the first combustion event, and then may return to 308.

At 310, method 300 may inject fuel for the first combustion event. The injection of fuel for the first combustion event may include fuel injection via one or more pilot injections followed by fuel injection via direct injection. Upon injection of the fuel into the cylinder via the fuel injector, in one example, the fuel may be combusted via spark ignition upon the piston reaching TDC. In another embodiment, the fuel in the cylinder may be ignited via compression ignition. Combustion of the gases in the cylinder may then force the piston downwards, as part of the combustion stroke of the piston.

At 312, method 300 may determine if the piston is in a position corresponding to exhaust valve opening (EVO). EVO may correspond to a point in a standard four-stroke engine cycle at which the exhaust valve is opened, prior to the beginning of a subsequent exhaust stroke of the piston, which may begin when the piston reaches BDC. In one example, EVO may be determined by the estimating if the piston position corresponds to the piston position at EVO for a standard four-stroke engine cycle. A piston position corresponding to EVO for a standard four-stroke cycle may be stored in the non-transitory memory of the controller, and the piston position may be estimated by the crankshaft position sensor, and compared to the value stored in the non-transitory memory of the controller. If the piston is not at the position corresponding to EVO for a standard four-stroke cycle, then method 300 may proceed to 313 to wait until the piston is at EVO, and then return to 312. If the piston is at EVO, method 300 proceeds to 314.

At 314, method 300 may open and close the exhaust valve for the exhaust stroke. The exhaust valve may be opened and closed via a cam actuation system. During the exhaust stroke, the piston may shift from BDC to TDC, pushing the combusted air-fuel mixture into an exhaust manifold (such as exhaust manifold 48 of FIG. 1) via the open exhaust valve. In conjunction with the motion of the piston, the exhaust valve may be actuated from a fully closed position when the piston is in BDC, to a fully open position when the piston is halfway between BDC and TDC, and back to a fully closed position as the piston reaches TDC. A fully open position may correspond to a maximum valve lift of the exhaust valve.

At 316, method 300 may once again open and close the exhaust valve for the intake stroke. The exhaust valve may be opened and closed as the piston moves from TDC to BDC. In conjunction with the motion of the piston, the exhaust valve may be actuated from a fully closed position when the piston is in TDC, to a fully open position when the piston is halfway between TDC and BDC, and back to a fully closed position as the piston reaches BDC. A fully open position may correspond to a maximum valve lift of the exhaust valve. Concurrently, the intake valve may be maintained closed via variable valve timing (VVT) as the piston moves from TDC to BDC. In another example, the intake valve may also be opened as the piston moves from TDC to BDC via unmodified operation of an intake valve cam actuation system (such as cam actuation system 51 of FIG. 1), such that the intake valve may be actuated from a fully closed position when the piston is in TDC, to a fully open position when the piston is halfway between TDC and BDC, and back to a fully closed position as the piston reaches BDC. As the piston moves from TDC to BDC, a vacuum is created in the cylinder, drawing in a mixture of previously combusted exhaust gas from the combustion in 310, and additional exhaust maintained in the exhaust manifold from previous combustions, which may be utilized for a second combustion event. In one example, the exhaust valve closing prior to the second combustion event may be advanced in order to reduce rich operation of the engine combustion.

At 318, method 300 may determine if the conditions are met for a second combustion event. In one example, the condition for a second combustion event may include that the piston is at TDC to allow for a main injection of fuel via a fuel injector. However, the conditions for the second combustion event may be different than the conditions for the first combustion event, owing to the difference in the intake gas during the respective intake strokes. In particular, due to the mixture of partially combusted exhaust gas with exhaust combusted during previous combustion cycles, the concentration of oxygen may be greatly reduced; consequently, the injection timing may be advanced with respect to the piston reaching TDC and the amount of fuel injected by the pilot injection may be reduced, in order to avoid rich operation, and the injection fractions may be optimized to minimize soot emissions. In another example, due to the already rich gases in the cylinder, the condition for a second combustion event may be that the piston is at an intermediate state between BDC and TDC in order to allow for pilot injection. However, the intermediate state of this example may differ from the intermediate state of the example of 308, in that it may be closer to TDC than the intermediate state of 308, to allow for advanced timing of pilot injection. The position of the piston may be determined by the crankshaft position sensor. If the conditions for a second combustion event are not met, then method 300 may proceed to 319 to wait until conditions are met for the first combustion event, and then may return to 318.

At 320, method 300 may inject fuel for the second combustion event. As mentioned in 318, the injection via pilot injection and a main injection for the first combustion event may be advanced, to reduce the possibility of rich operation, and the quantity of pilot injection fuel may be reduced. Upon injection of the fuel into the cylinder via the fuel injector, in one embodiment, the fuel may be combusted via spark ignition upon the piston reaching TDC. In another embodiment, the fuel in the cylinder may be ignited via compression ignition. Combustion of the gases in the cylinder may then force the piston downwards, as part of the combustion stroke of the piston.

At 322, method 300 may determine if the piston is in a position corresponding to exhaust valve opening (EVO). EVO may correspond to a point in a standard four-stroke engine cycle at which the exhaust valve is opened, prior to the beginning of a subsequent exhaust stroke of the piston, which may begin when the piston reaches BDC. In one example, EVO may be determined by the estimating if the piston position corresponds to the piston position at EVO for a standard four-stroke engine cycle. A piston position corresponding to EVO for a standard four-stroke cycle may be stored in the non-transitory memory of the controller, and the piston position may be estimated by the crankshaft position sensor, and compared to the value stored in the non-transitory memory of the controller. If the piston is not at the position corresponding to EVO for a standard four-stroke cycle, then method 300 may proceed to 323 to wait until the piston is at EVO, and then return to 322. If the piston is at EVO, method 300 proceeds to 324.

At 324, method 300 may open and close the exhaust valve for the exhaust stroke. The exhaust valve may be opened and closed via a cam actuation system. During the exhaust stroke, the piston may shift from BDC to TDC, pushing combusted exhaust gas into an exhaust manifold (such as exhaust manifold 48 of FIG. 1) via the open exhaust valve, which may then be routed through the emission control system and a turbine (not shown). With the opening and closing of the exhaust valve in conjunction with the exhaust stroke, rebreathing may end, and method 300 may proceed to 326 to alternate cylinder operation to a standard four-stroke cycle, in which intake air (including EGR) is routed into the cylinder during the intake stroke via the intake valve, and exhaust gas is routed into the exhaust manifold during the exhaust stroke via the exhaust valve. Alternating cylinder operation may include performing a four-stroke cycle, and then returning to performing rebreathing, in a cyclic manner. Method 300 may then end.

In this way, both FIGS. 2 and 3 describe methods for implementing rebreathing in the engine, in which the intake valve may be opened during a first intake stroke and either of the intake valve or exhaust valve may be opened during a first exhaust stroke during a first engine cycle of the cylinder. In a second engine cycle of the cylinder immediately following the first engine cycle, either the intake valve or the exhaust valve may be opened during a second intake stroke to rebreathe combusted gases into the cylinder, after which the exhaust valve may be opened as part of a second exhaust stroke. For example, opening the intake valve during the first exhaust stroke may include fully opening the intake valve during the first exhaust stroke while maintaining the intake valve closed to expel the combusted gases to an intake manifold, whereas opening the exhaust valve during the second intake stroke may include opening the exhaust valve during the second intake stroke while maintaining the intake valve closed in order to rebreathe the combusted gases from the intake manifold.

Figure 4:
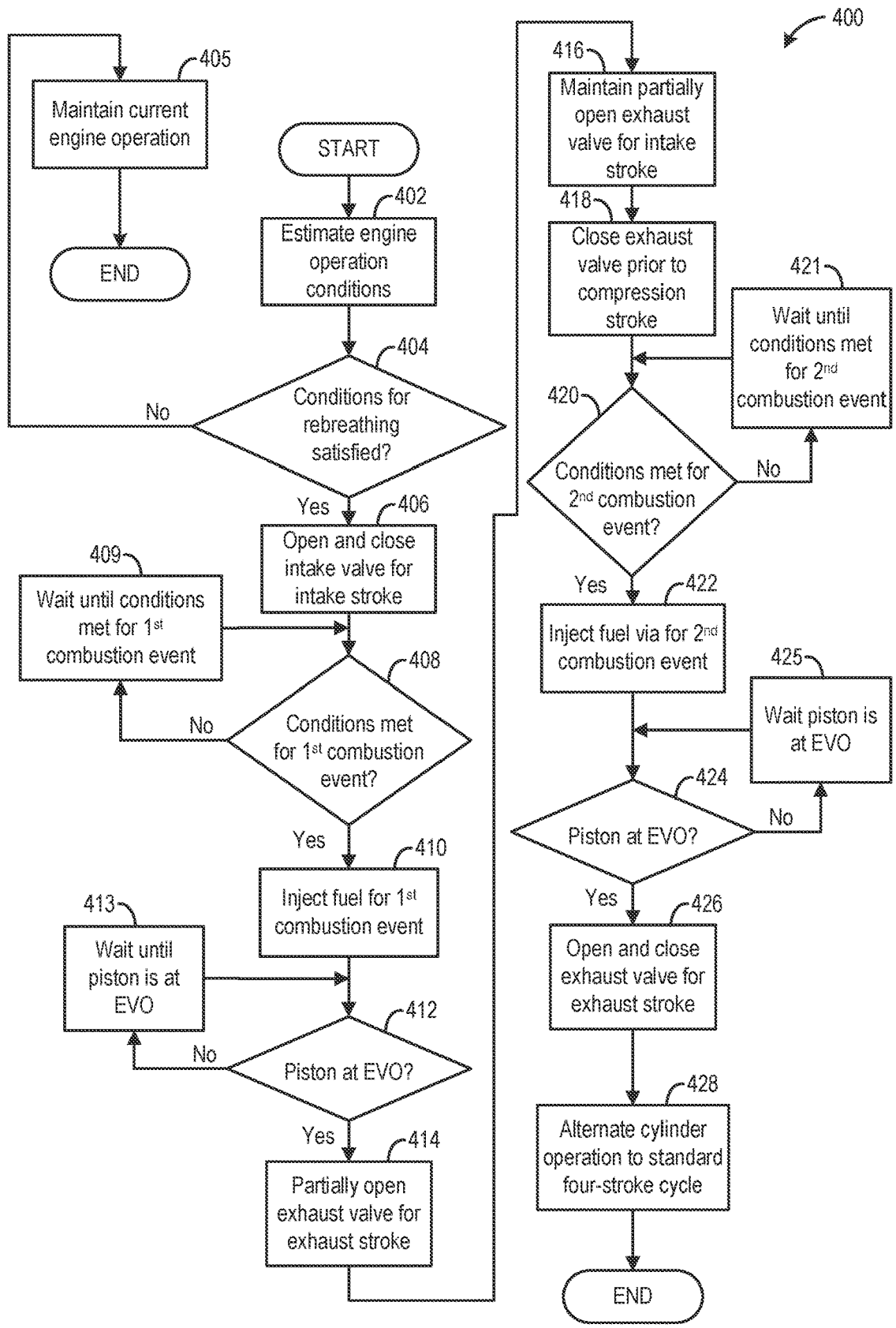
FIG. 4 shows a flowchart for a third example method for maintaining partially open the exhaust valve during an intake stroke and the exhaust stroke of the piston in the cylinder.

FIG. 4 shows a third method 400 for rebreathing by rebreathing exhaust gas from an exhaust manifold (such as exhaust manifold 48 of FIG. 1) via an exhaust valve (such as exhaust valve 54 of FIG. 1) of a multi-cylinder engine (such as engine 10 of FIG. 1) of a vehicle (such as vehicle 100 of FIG. 1).

At 402, method 400 may estimate engine operating conditions. Estimating engine operating conditions may involve estimating the engine load and engine speed. As explained in relation to FIG. 1, a profile ignition pickup signal (PIP) from a sensor (such as Hall effect sensor 118 of FIG. 1) coupled to the crankshaft (such as crankshaft 40 of FIG. 1) may be used to determine the engine speed or RPM of the engine. Engine load may be determined through air flow measurements via a including a MAF sensor (such as MAF sensor 120 of FIG. 1). Properties of the exhaust gas upstream of an emission control system (such as emission control system 70 of FIG. 1), such as the exhaust gas air/fuel ratio may be determined via an exhaust gas sensor (such as exhaust gas sensor 126 and/or exhaust gas sensor 162 of FIG. 1). Additionally, the temperature of the exhaust gas within an SCR catalyst (such as SCR catalyst 71 of FIG. 1) may be determined via an SCR sensor (such as SCR catalyst sensor 73 of FIG. 1) or an exhaust temperature sensor in order to determine if the SCR catalyst is operating at a sufficiently high temperature for effective catalytic reaction. Further ambient conditions such as ambient temperature and humidity may be estimated.

At 404, method 400 may determine if conditions for initiating rebreathing are satisfied. Rebreathing may involve partially opening an exhaust valve (such as exhaust valve 54 of FIG. 1) as part of the exhaust stroke, expelling exhaust gas from a cylinder (such as cylinder 30 of FIG. 1) after a first combustion event, and maintaining the exhaust valve in a partially open position in order to rebreathe exhaust in the immediately subsequent intake stroke of a piston (such as piston 36 of FIG. 1) for a second combustion event. The conditions for initiating rebreathing may include in one example determining if the engine speed is below a threshold engine speed. For example, the threshold engine speed may be set as the idling speed, or at a near idling speed. As an example, the threshold speed may be one value in the range of 600-1000 RPM. Alternatively, rebreathing may be initiated throughout the engine speed range. The conditions for initiating rebreathing may also include determining if the SCR catalyst is operating below a threshold temperature. As an example, the threshold temperature may be set as the light off temperature, which is the temperature at which catalysis operates at 50% efficiency. If the SCR catalyst is below the threshold temperature, rebreathing may be initiated in order to increase the exhaust gas temperature for more efficient operation of the SCR catalyst. If the conditions for rebreathing are not satisfied, method 400 may proceed to 405 to maintain current engine operating conditions. For example, the current engine operating conditions may include opening the intake valve during the intake stroke, with the exhaust valve closed, and opening the exhaust valve during the exhaust stroke, with the intake valve closed. After returning to maintaining current engine operations, the method may end.

If it is determined that conditions are met for rebreathing of the engine cylinders, at 406, method 400 may open and close an intake valve (such as intake valve 52 of FIG. 1) to intake air from the intake manifold during an intake stroke of the piston. The intake valve may be actuated to open to a fully open position and close to a fully closed position during the motion of the piston from top dead center (TDC) to bottom dead center (BDC). In conjunction with the motion of the piston, the intake valve may be actuated from a fully closed position when the piston is in TDC, to a fully open position when the piston is halfway between TDC and BDC, and back to a fully closed position as the piston reaches BDC. A fully open position may correspond to a maximum valve lift of the intake valve. As mentioned in relation to FIG. 1, the intake valve may be actuated by a cam actuation system (such as cam actuation system 51 of FIG. 1) in one embodiment, or by electronic valve actuation. Opening and closing of the intake valve during the intake stroke may allow air from the intake manifold to flow into the cylinder, in which a vacuum is generated due to the motion of the piston from TDC to BDC. In addition to intake air, exhaust gas from the exhaust gas recirculation (EGR) system provided by an EGR passage (such as EGR passage 140 of FIG. 1) into the intake manifold may also flow from the intake manifold into the cylinder due to the vacuum generated therein.

At 408, method 400 may then determine if the conditions for a first combustion event are met. In one example, the condition for a first combustion event may be that the piston is at TDC to allow for a main injection of fuel via a fuel injector (such as fuel injector 66 of FIG. 1). In another example, the condition for a first combustion event may be that the piston is at an intermediate state between BDC and TDC during the compression stroke in order to allow for pilot injection of fuel vapor into the cylinder via a fuel injector (such as fuel injector 66 of FIG. 1). The injection timing of both the pilot injections and the main injection may be retarded from the piston reaching TDC in order to maintain $NO_x$ levels and lower noise. In another example, pilot injection may also be altered by increasing the number of pilots and increasing the amount of fuel injected via pilot injection to maintain lower noise during conditions when a lower level of exhaust gas recirculation (EGR) is provided to the cylinder(s). The position of the piston may be determined by a crankshaft position sensor. If the conditions for a first combustion event are not met, then method 400 may proceed to 409 to wait until conditions are met for the first combustion event, and then may return to 408.

At 410, method 400 may inject fuel for the first combustion event. The injection of fuel for the first combustion event may include fuel injection via one or more pilot injections followed by fuel injection via direct injection. Upon injection of the fuel into the cylinder via the fuel injector, in one example, the fuel may be combusted via spark ignition upon the piston reaching TDC. In another embodiment, the fuel in the cylinder may be ignited via compression ignition. Combustion of the gases in the cylinder may then force the piston downwards, as part of the combustion stroke of the piston.

At 412, method 400 may determine if the piston is in a position corresponding to exhaust valve opening (EVO). EVO may correspond to a point in a standard four-stroke engine cycle at which the exhaust valve is opened, prior to the beginning of a subsequent exhaust stroke of the piston, which may begin when the piston reaches BDC. In one example, EVO may be determined by the estimating if the piston position corresponds to the piston position at EVO for a standard four-stroke engine cycle. A piston position corresponding to EVO for a standard four-stroke cycle may be stored in the non-transitory memory of the controller, and the piston position may be estimated by the crankshaft position sensor, and compared to the value stored in the non-transitory memory of the controller. If the piston is not at the position corresponding to EVO for a standard four-stroke cycle, then method 400 may proceed to 413 to wait until the piston is at EVO, and then return to 412. If the piston is at EVO, method 400 proceeds to 414.

At 414, method 400 may partially open the exhaust valve for the exhaust stroke. The exhaust valve being partially open may be 10-20% of the fully open operation of the exhaust valve opening during a standard four-stroke cycle, wherein during the standard four-stroke cycle the exhaust valve reaches a fully open position during the exhaust stroke. In one example, the exhaust valve may be displaced by 1 mm for partial venting during the exhaust stroke as opposed to being displaced by more than 1 mm for full venting (e.g., during the standard four-stroke cycle). The exhaust valve may be partially opened via a cam actuation system, employing one or more of variable valve timing (VVT), variable cam timing (VCT) or variable valve lift (VVL) in order to maintain the exhaust valve open for a longer period of time in conjunction with cam profile switching (CPS) to partially open the exhaust valve. The exhaust valve may not be closed at the end of the exhaust stroke. Due to the smaller opening of the exhaust valve, as the piston may shift from BDC to TDC, a smaller portion of the combusted air-fuel mixture may be pushed out into an exhaust manifold (such as exhaust manifold 48 of FIG. 1) via the partially open exhaust valve. A higher portion of the combusted air-fuel mixture may be maintained within the cylinder for combustion.

At 416, method 400 may maintain the exhaust valve partially open for the intake stroke immediately following the exhaust stroke. The exhaust valve may be maintained partially open as the piston moves from TDC to BDC. The opening of the exhaust valve during the intake stroke may be same as that of the exhaust valve during the immediately previous intake stroke. In this way, exhaust gas may be allowed to leave and enter the cylinder through the partially open exhaust valve during both the exhaust stroke and the intake stroke. Concurrently, the intake valve may be maintained closed via VVT as the piston moves from TDC to BDC. In another example, the intake valve may also be opened as the piston moves from TDC to BDC via unmodified operation of an intake valve cam actuation system (such as cam actuation system 51 of FIG. 1), such that the intake valve may be actuated from a fully closed position when the piston is in TDC, to a fully open position when the piston is halfway between TDC and BDC, and back to a fully closed position as the piston reaches BDC. As the piston moves from TDC to BDC, a vacuum is created in the cylinder, drawing in a mixture of partially combusted exhaust gas from the combustion in 410, and additional exhaust maintained in the exhaust manifold from previous combustions, which may be utilized for a second combustion event.

At 418, method 400 may close the exhaust valve prior to a compression stroke. The timing of the closing of the exhaust valve during the exhaust stroke may depend on the extent of opening of the exhaust valve in steps 414, 416. In one example, the exhaust valve may be closed once the piston arrives in BDC. In another example, the exhaust valve may be closed in an intermediate state between TDC and BDC, and may be actuated to a closed position by the cam actuation system via VVT.

At 420, method 400 may determine if the conditions are met for a second combustion event. In one example, the condition for a second combustion event may include that the piston is at TDC to allow for a main injection of fuel via a fuel injector. However, the conditions for the second combustion event may be different than the conditions for the first combustion event, owing to the difference in the intake gas during the respective intake strokes. In particular, due to the mixture of partially combusted exhaust gas with exhaust combusted during previous combustion cycles, the concentration of oxygen may be greatly reduced; consequently, the injection timing may be advanced and the amount of fuel injected by the pilot injection may be reduced, in order to avoid rich operation, and the injection fractions may be optimized to minimize soot emissions. In another example, due to the already rich gases in the cylinder, the condition for a second combustion event may be that the piston is at an intermediate state between BDC and TDC in order to allow for pilot injection. However, the intermediate state of this example may differ from the intermediate state of the example of 408, in that it may be closer to TDC than the intermediate state of 408, to allow for advanced timing of pilot injection. The position of the piston may be determined by the crankshaft position sensor. If the conditions for a second combustion event are not met, then method 400 may proceed to 421 to wait until conditions are met for the first combustion event, and then may return to 420.

At 422, method 400 may inject fuel for the second combustion event. As mentioned in 420, the injection for both pilot injections and a main injection for the first combustion event may be advanced to reduce the possibility of rich operation, and the quantity of pilot injection fuel may be reduced. Upon injection of the fuel into the cylinder via the fuel injector, in one embodiment, the fuel may be combusted via spark ignition upon the piston reaching TDC. In another embodiment, the fuel in the cylinder may be ignited via compression ignition. Combustion of the gases in the cylinder may then force the piston downwards, as part of the combustion stroke of the piston. At 424, method 400 may determine if the piston is in a position corresponding to exhaust valve opening (EVO). EVO may correspond to a point in a standard four-stroke engine cycle at which the exhaust valve is opened, prior to the beginning of a subsequent exhaust stroke of the piston, which may begin when the piston reaches BDC. In one example, EVO may be determined by the estimating if the piston position corresponds to the piston position at EVO for a standard four-stroke engine cycle. A piston position corresponding to EVO for a standard four-stroke cycle may be stored in the non-transitory memory of the controller, and the piston position may be estimated by the crankshaft position sensor, and compared to the value stored in the non-transitory memory of the controller. If the piston is not at the position corresponding to EVO for a standard four-stroke cycle, then method 400 may proceed to 425 to wait until the piston is at EVO, and then return to 424. If the piston is at EVO, method 400 proceeds to 426.

At 426, method 400 may open and close the exhaust valve for the exhaust stroke. The exhaust valve may be opened and closed via the cam actuation system. During the exhaust stroke, the piston may shift from BDC to TDC, pushing combusted exhaust gas into the exhaust manifold via the open exhaust valve, which may then be routed through the emission control system and a turbine (not shown). With the opening and closing of the exhaust valve in conjunction with the exhaust stroke, rebreathing may end, and method 400 may proceed to 426 to alternate cylinder operation to a standard four-stroke cycle, in which intake air (including EGR) is routed into the cylinder during the intake stroke via the intake valve, and exhaust gas is routed into the exhaust manifold during the exhaust stroke via the exhaust valve. Alternating cylinder operation may include performing a four-stroke cycle, and then returning to performing rebreathing, in a cyclic manner. Method 400 may then end.

Figure 5:
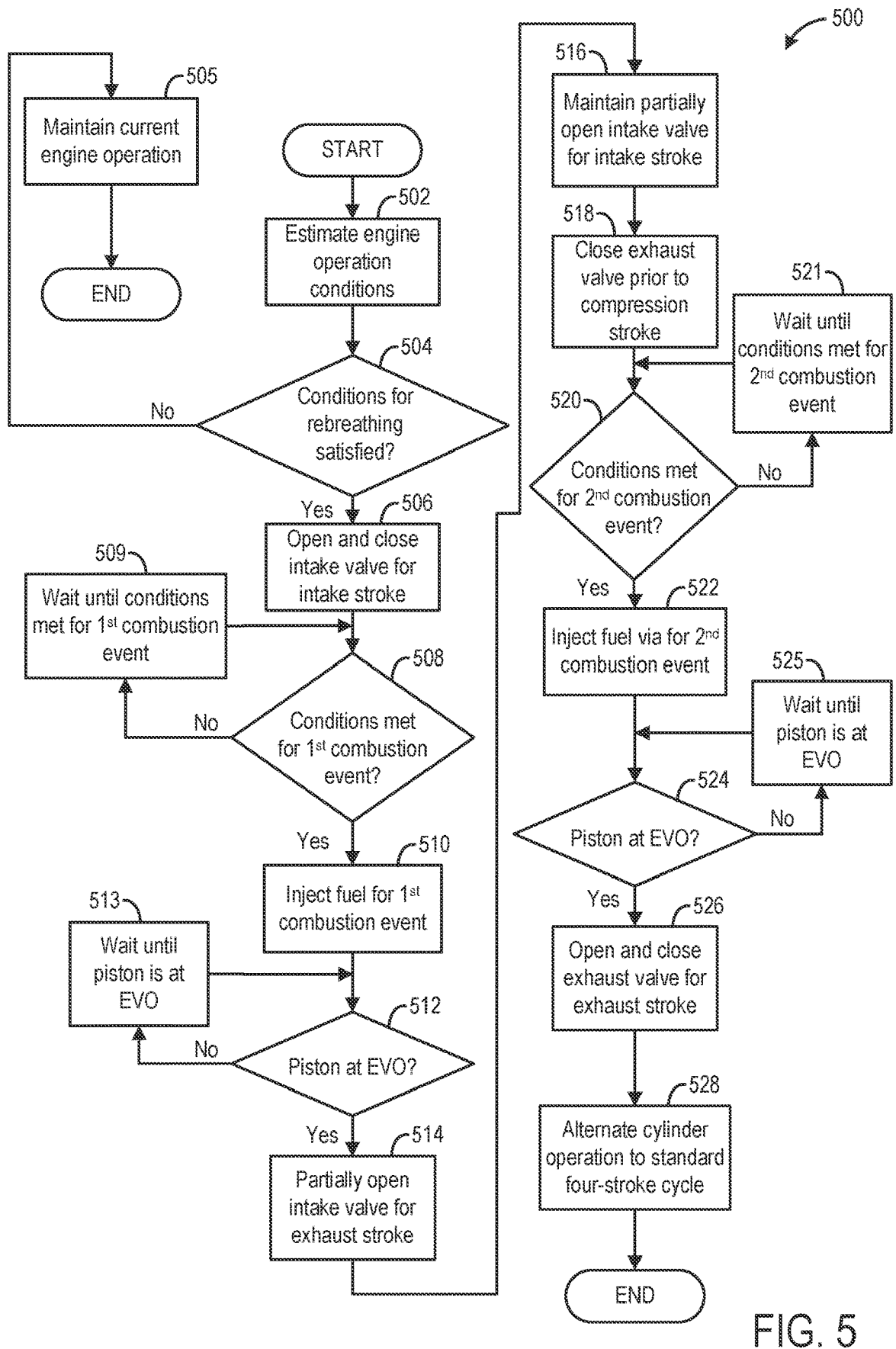
FIG. 5 shows a flowchart for a fourth example method for maintaining partially open the intake valve during the intake stroke and the exhaust stroke of the piston in the cylinder.

FIG. 5 shows a fourth method 500 for rebreathing by rebreathing in an air/exhaust gas mixture from an intake manifold (such as intake manifold 44 of FIG. 1) via an intake valve (such as intake valve 52 of FIG. 1) of a multi-cylinder engine (such as engine 10 of FIG. 1) of a vehicle (such as vehicle 100 of FIG. 1).

At 502, method 500 may estimate engine operating conditions. Estimating engine operating conditions may involve estimating the engine load and engine speed. As explained in relation to FIG. 1, a profile ignition pickup signal (PIP) from a sensor (such as Hall effect sensor 118 of FIG. 1) coupled to the crankshaft (such as crankshaft 40 of FIG. 1) may be used to determine the engine speed or RPM of the engine. Engine load may be determined through air flow measurements via a including a MAF sensor (such as MAF sensor 120 of FIG. 1). Properties of the exhaust gas upstream of an emission control system (such as emission control system 70 of FIG. 1), such as the exhaust gas air/fuel ratio may be determined via an exhaust gas sensor (such as exhaust gas sensor 126 and/or exhaust gas sensor 162 of FIG. 1). Additionally, the temperature of the exhaust gas within an SCR catalyst (such as SCR catalyst 71 of FIG. 1) may be determined via an SCR sensor (such as SCR catalyst sensor 73 of FIG. 1) or an exhaust temperature sensor in order to determine if the SCR catalyst is operating at a sufficiently high temperature for effective catalytic reaction. Further ambient conditions such as ambient temperature and humidity may be estimated.

At 504, method 500 may determine if conditions for initiating rebreathing are satisfied. Rebreathing may involve partially opening an intake valve (such as intake valve 52 of FIG. 1) as part of the exhaust stroke, expelling exhaust gas from a cylinder (such as cylinder 30 of FIG. 1) after a first combustion event, and maintaining the intake valve in a partially open position in order to rebreathe a mixture of air and partially burned exhaust in the immediately subsequent intake stroke of a piston (such as piston 36 of FIG. 1) for a second combustion event. The conditions for initiating rebreathing may include in one example determining if the engine speed is below a threshold engine speed. For example, the threshold engine speed may be set as the idling speed, or at a near idling speed. As an example, the threshold speed may be one value in the range of 600-1000 RPM. Alternatively, rebreathing may be initiated throughout the engine speed range. The conditions for initiating rebreathing may also include determining if the SCR catalyst is operating below a threshold temperature. As an example, the threshold temperature may be set as the light off temperature, which is the temperature at which catalysis operates at 50% efficiency. If the SCR catalyst is below the threshold temperature, rebreathing may be initiated in order to increase the exhaust gas temperature for more efficient operation of the SCR catalyst. If the conditions for rebreathing are not satisfied, method 500 may proceed to 505 to maintain current engine operating conditions. For example, the current engine operating conditions may include opening the intake valve during the intake stroke, with the exhaust valve closed, and opening the exhaust valve during the exhaust stroke, with the intake valve closed. After returning to maintaining current engine operations, the method may end.

If it is determined that conditions are met for rebreathing of the engine cylinders, at 506, method 500 may open and close an intake valve (such as intake valve 52 of FIG. 1) to intake air from the intake manifold during an intake stroke of the piston. The intake valve may be actuated to open to a fully open position and close to a fully closed position during the motion of the piston from top dead center (TDC) to bottom dead center (BDC). A fully open position may correspond to a maximum valve lift of the intake valve. In conjunction with the motion of the piston, the intake valve may be actuated from a fully closed position when the piston is in TDC, to a fully open position when the piston is halfway between TDC and BDC, and back to a fully closed position as the piston reaches BDC. As mentioned in relation to FIG. 1, the intake valve may be actuated by a cam actuation system (such as cam actuation system 51 of FIG. 1) in one embodiment, or by electronic valve actuation. Opening and closing of the intake valve during the intake stroke may allow air from the intake manifold to flow into the cylinder, in which a vacuum is generated due to the motion of the piston from TDC to BDC. In addition to intake air, exhaust gas from the exhaust gas recirculation (EGR) system provided by an EGR passage (such as EGR passage 140 of FIG. 1) into the intake manifold may also flow from the intake manifold into the cylinder due to the vacuum generated therein.

At 508, method 500 may then determine if the conditions for a first combustion event are met. In one example, the condition for a first combustion event may be that the piston is at TDC to allow for a main injection of fuel via a fuel injector (such as fuel injector 66 of FIG. 1). In another example, the condition for a first combustion event may be that the piston is at an intermediate state between BDC and TDC during the compression stroke in order to allow for pilot injection of fuel vapor into the cylinder via the fuel injector. The injection timing of both the pilot injections and the main injection may be retarded from the piston reaching TDC in order to maintain $NO_x$ levels and lower noise. In another example, pilot injection may also be altered by increasing the number of pilots and increasing the amount of fuel injected via pilot injection to maintain lower noise during conditions when a lower level of exhaust gas recirculation (EGR) is provided to the cylinder(s). The position of the piston may be determined by a crankshaft position sensor. If the conditions for a first combustion event are not met, then method 500 may proceed to 509 to wait until conditions are met for the first combustion event, and then may return to 508.

At 510, method 500 may inject fuel for the first combustion event. The injection of fuel for the first combustion event may include fuel injection via one or more pilot injections followed by fuel injection via direct injection. Upon injection of the fuel into the cylinder via the fuel injector, in one example, the fuel may be combusted via spark ignition upon the piston reaching TDC. In another embodiment, the fuel in the cylinder may be ignited via compression ignition. Combustion of the gases in the cylinder may then force the piston downwards, as part of the combustion stroke of the piston.

At 512, method 500 may determine if the piston is in a position corresponding to exhaust valve opening (EVO). EVO may correspond to a point in a standard four-stroke engine cycle at which the exhaust valve is opened, prior to the beginning of a subsequent exhaust stroke of the piston, which may begin when the piston reaches BDC. In one example, EVO may be determined by the estimating if the piston position corresponds to the piston position at EVO for a standard four-stroke engine cycle. A piston position corresponding to EVO for a standard four-stroke cycle may be stored in the non-transitory memory of the controller, and the piston position may be estimated by the crankshaft position sensor, and compared to the value stored in the non-transitory memory of the controller. If the piston is not at the position corresponding to EVO for a standard four-stroke cycle, then method 500 may proceed to 513 to wait until the piston is at EVO, and then return to 512. If the piston is at EVO, method 500 proceeds to 514.

At 514, method 500 may partially open the intake valve for the exhaust stroke. The intake valve being partially open may be 10-20% of the fully open operation of the intake valve opening during a standard four-stroke cycle, wherein during the standard four-stroke cycle the intake valve reaches a fully open position during the intake stroke. In one example, the intake valve may be displaced by 1 mm for partial venting during the exhaust stroke as opposed to being displaced by more than 1 mm for full venting (e.g., during the standard four-stroke cycle). The intake valve may be partially opened via a cam actuation system, employing one or more of variable valve timing (VVT), variable cam timing (VCT) or variable valve lift (VVL) in order to maintain the intake valve open for a longer period of time in conjunction with cam profile switching (CPS) to partially open the intake valve. The intake valve may not be closed at the end of the exhaust stroke. Concurrently, the exhaust valve may be maintained closed via VVT as the piston moves from BDC to TDC. In another example, the exhaust valve may also be opened as the piston moves from BDC to TDC via unmodified operation of an exhaust valve cam actuation system (such as cam actuation system 53 of FIG. 1), such that the exhaust valve may be actuated from a fully closed position when the piston is in BDC, to a fully open position when the piston is halfway between BDC and TDC, and back to a fully closed position as the piston reaches TDC. Due to the smaller opening of the intake valve, as the piston may shift from BDC to TDC, a smaller portion of the combusted air-fuel mixture may be pushed out into the intake manifold via the partially open intake valve. A higher portion of the combusted air-fuel mixture may be maintained within the cylinder for combustion.

At 516, method 500 may maintain the intake valve partially open for the intake stroke immediately following the exhaust stroke. The intake valve may be maintained partially open as the piston moves from TDC to BDC. The opening of the intake valve during the intake stroke may be same as that of the intake valve during the immediately previous intake stroke. In this way, a mixture of exhaust gas from EGR, the combusted air-fuel mixture, and air may be allowed to leave and enter the cylinder through the partially open intake valve during both the exhaust stroke and the intake stroke. Concurrently, the exhaust valve may be maintained closed via VVT as the piston moves from TDC to BDC. As the piston moves from TDC to BDC, a vacuum is created in the cylinder, drawing in a mixture of partially combusted exhaust gas from the combustion in 510, exhaust from the EGR system, and air in the intake manifold, which may be utilized for a second combustion event.

At 518, method 500 may close the intake valve prior to a compression stroke. The timing of the intake valve in steps 514, 516. In one example, the intake valve may be closed once the piston arrives in BDC. In another example, the intake valve may be closed in an intermediate state between TDC and BDC, and may be actuated to a closed position by the cam actuation system via VVT.

At 520, method 500 may determine if the conditions are met for a second combustion event. In one example, the condition for a second combustion event may include that the piston is at TDC to allow for a main injection of fuel via a fuel injector. However, the conditions for the second combustion event may be different than the conditions for the first combustion event, owing to the difference in the intake gas during the respective intake strokes. In particular, due to the mixture of partially combusted exhaust gas with air, the concentration of oxygen may be reduced; consequently, the injection timing may be advanced and the amount of fuel injected by the pilot injection may be reduced, in order to avoid rich operation, and the injection fractions may be optimized to minimize soot emissions. In another example, due to the already rich gases in the cylinder, the condition for a second combustion event may be that the piston is at an intermediate state between BDC and TDC in order to allow for pilot injection. However, the intermediate state of this example may differ from the intermediate state of the example of 508, in that it may be closer to TDC than the intermediate state of 508, to allow for advanced timing of pilot injection. The position of the piston may be determined by the crankshaft position sensor. If the conditions for a second combustion event are not met, then method 500 may proceed to 521 to wait until conditions are met for the first combustion event, and then may return to 520.

At 522, method 500 may inject fuel for the second combustion event. As mentioned in 520, the injection for both pilot injections and a main injection for the first combustion event may be advanced to reduce the possibility of rich operation, and the quantity of pilot injection fuel may be reduced. Upon injection of the fuel into the cylinder via the fuel injector, in one embodiment, the fuel may be combusted via spark ignition upon the piston reaching TDC. In another embodiment, the fuel in the cylinder may be ignited via compression ignition. Combustion of the gases in the cylinder may then force the piston downwards, as part of the combustion stroke of the piston.

At 524, method 500 may determine if the piston is in a position corresponding to exhaust valve opening (EVO). EVO may correspond to a point in a standard four-stroke engine cycle at which the exhaust valve is opened, prior to the beginning of a subsequent exhaust stroke of the piston, which may begin when the piston reaches BDC. In one example, EVO may be determined by the estimating if the piston position corresponds to the piston position at EVO for a standard four-stroke engine cycle. A piston position corresponding to EVO for a standard four-stroke cycle may be stored in the non-transitory memory of the controller, and the piston position may be estimated by the crankshaft position sensor, and compared to the value stored in the non-transitory memory of the controller. If the piston is not at the position corresponding to EVO for a standard four-stroke cycle, then method 500 may proceed to 525 to wait until the piston is at EVO, and then return to 524. If the piston is at EVO, method 500 proceeds to 526.

At 526, method 500 may open and close the exhaust valve for the exhaust stroke. The exhaust valve may be opened and closed via the cam actuation system. During the exhaust stroke, the piston may shift from BDC to TDC, pushing combusted exhaust gas into the exhaust manifold via the open exhaust valve, which may then be routed through the emission control and a turbine (not shown). With the opening and closing of the exhaust valve in conjunction with the exhaust stroke, rebreathing may end, and method 500 may proceed to 526 to alternate cylinder operation to a standard four-stroke cycle, in which intake air (including EGR) is routed into the cylinder during the intake stroke via the intake valve, and exhaust gas is routed into the exhaust manifold during the exhaust stroke via the exhaust valve. Alternating cylinder operation may include performing a four-stroke cycle, and then returning to performing rebreathing, in a cyclic manner. Method 500 may then end.

Figure 6:
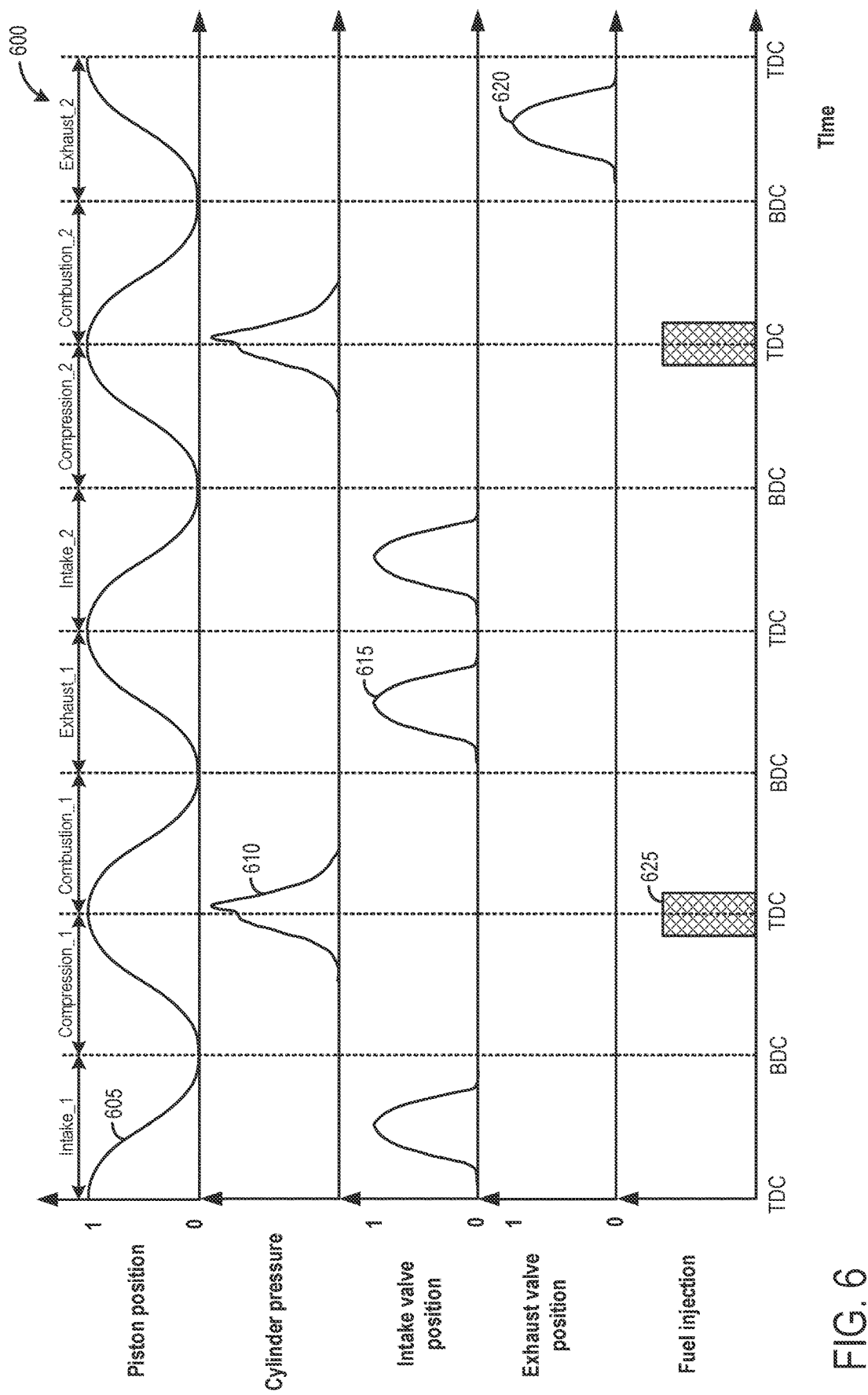
FIG. 6 depicts an example of the modified operation of intake and exhaust valves for rebreathing, according to the method of FIG. 2 of the present disclosure.

FIG. 6 illustrates a timing chart 600 of the modified operation of intake and exhaust valves for rebreathing in an engine cylinder (such as cylinder 30 of FIG. 1), according to the method of FIG. 2 of the present disclosure. Time corresponding to the periodic cycling of a piston (such as piston 36 of FIG. 1), with reference to the top dead center (TDC) and bottom dead center (BDC) extrema within the cycling motion of the piston, is shown along the x-axis. Referring now to the top plot in the timing chart 600, curve 605 depicts a position of a piston (such as piston 36 of FIG. 1) in the cylinder, with positions (along the y-axis) of the piston ranging from TDC and/or BDC, and with further reference to strokes of the piston within the four strokes (intake, compression, power, and exhaust) of an engine cycle. The curve 605 depicts the piston position in terms of sinusoidally cycling through two conventional cycles of a four-stroke cycle in order to complete rebreathing, with labels intake_1, compression_1, combustion_1, exhaust_1, and intake_2, compression_2, combustion_2, and exhaust_2 labelling the time intervals associated with intake, compression, power, and exhaust strokes. Timing chart 600 further depicts the cylinder pressure in the curve 610, illustrating the change in pressure that occurs in the cylinder over the intake, compression, power, and exhaust strokes. In order for rebreathing depicted in timing chart 600 to occur, operation of an intake valve (such as intake valve 52 of FIG. 1) is modified from standard operation of a four-stroke cycle. The intake valve position during rebreathing is depicted by curve 615, and the exhaust valve position (such as for exhaust valve 54 of FIG. 1) during rebreathing is depicted by curve 620. The fuel injection profile operating during rebreathing is schematically depicted by plot 625.

During a first intake stroke (depicted here as intake_1 stroke), the piston moves from TDC to BDC. At TDC, the intake valve is fully opened and at BDC, the intake valve is fully closed, with the opening of the valve being highest (e.g., maximum valve lift) at the midpoint between TDC and BDC. When the intake valve is in the open position, air from an intake manifold (such as intake manifold 44 of FIG. 1) flows into the cylinder. During the intake stroke, fuel is not injected and combustion is not carried out. Consequently, the cylinder pressure is maintained at a baseline equilibrium value, and the exhaust valve is maintained in a closed position.

A first compression stroke (depicted here as compression_1 stroke) may follow the intake_1 stroke. During the compression_1 stroke of rebreathing, the piston moves from BDC to TDC. The intake valve and the exhaust valve are both maintained in the closed position. As the piston moves to TDC the air within the cylinder is compressed and the pressure in the cylinder increases as the piston. At the end of the compression stroke, as the piston approaches TDC, fuel is injected into the cylinder. While the fuel injection into the cylinder is depicted in plot 625 as one main injection occurring near the end of the compression_1 stroke, as mentioned in relation to FIG. 2, fuel injection could include a main injection and also one or more pilot injections preceding the main (direct) injection. Further, fuel injection timing may be retarded with respect to the piston reaching TDC as compared to a typical fuel injection event for a four-stroke cycle, in order to maintain $NO_x$ levels and lower noise.

A first combustion stroke (depicted here as combustion_1 stroke) may follow the compression_1 stroke. During the combustion_1 stroke of rebreathing, the piston moves from TDC to BDC. Combustion occurs at the beginning of the combustion_1 stroke, when the piston is at TDC. In one example, the combustion is initiated via spark ignition upon the piston reaching TDC. In another example, the combustion is initiated via compression ignition upon the piston reaching TDC. Correspondingly, due to the energy from the combustion, and the piston is further driven from TDC to BDC. As the piston is driven from TDC to BDC, the pressure in the cylinder decreases with the expansion of the combusted gases, dropping to the baseline equilibrium value as the cylinder reaches BDC. Concomitantly, the intake valve and the exhaust valve are maintained closed, allowing the combusted gases to do work on the piston.

A first exhaust stroke (depicted here as exhaust_1 stroke) follows the combustion_1 stroke. During the exhaust_1 stroke of rebreathing, the piston moves from BDC to TDC. At BDC, instead of the exhaust valve, the intake valve is fully opened and at TDC, the intake valve is fully closed, the opening of the intake valve being highest at the midpoint between BDC and TDC. In the open position, the partially combusted gases in the cylinder following the previous combustion_1 stroke are expelled into the intake manifold. The exhaust valve is maintained in a closed position over the entirety of the first exhaust stroke and the exhaust gases are not routed to the exhaust manifold. During the exhaust_1 stroke fuel injection is maintained off, and the cylinder pressure is maintained at the baseline equilibrium value.

A second intake stroke (depicted here as intake_2 stroke) may follow the exhaust_1 stroke. During the intake_2 stroke of rebreathing, the piston moves from TDC to BDC. At TDC, the intake valve is fully opened and at BDC, the intake valve is fully closed, the opening of the valve being highest at the midpoint between TDC and BDC. In the open position, a combination of fresh ambient air in the intake manifold and partially combusted gases (expelled to the intake manifold during the exhaust_1 stroke) from the intake manifold flows into the cylinder through a vacuum in the cylinder generated by the motion of the piston. In this way, combusted air fuel mixture is rebreathed into the cylinder for re-combustion. The exhaust valve is maintained in a closed position over the entirety of the second intake stroke, fuel injection is maintained off, and the cylinder pressure is maintained at the baseline equilibrium value as throughout the intake_2 stroke.

A second compression stroke (depicted here as compression_2 stroke) may follow the intake_2 stroke. During the compression_2 stroke of rebreathing, the piston moves from BDC to TDC. The intake valve and the exhaust valve are both maintained in the closed position, such that the pressure in the cylinder increases as the piston compresses the air maintained in the cylinder. Correspondingly, as the piston approaches TDC, fuel is injected into the cylinder. While the fuel injection into the cylinder is depicted in plot 625 as one main injection occurring near the end of the compression_1 stroke, as mentioned in relation to FIG. 2, the fuel injection could include a main injection and also one or more pilot injections. In contrast with the compression_1 stroke of rebreathing, the number of pilot injections may be reduced and the injection volume of the pilot injections may be reduced, in order to reduce the possibility of rich operation of the cylinder, and the injection fractions are optimized to minimize soot emissions. Further, the injection timings of the pilot injections and the main injection are advanced with respect to the piston position as compared to a typical four-stroke engine cycle, additionally to reduce the possibility of rich operation of the cylinder.

A second combustion stroke (depicted here as combustion_2 stroke) may follow the compression_2 stroke. During the combustion_2 stroke of rebreathing, the piston moves from TDC to BDC. Combustion occurs at the beginning of the combustion_1 stroke, when the piston is at TDC. In one example, the combustion is ignited via spark ignition upon the piston reaching TDC. In another example, the combustion is ignited via compression ignition upon the piston reaching TDC. Correspondingly, due to the energy from the combustion, the piston is driven from TDC to BDC. As the piston is driven from TDC to BDC, the pressure in the cylinder decreases with the expansion of the partially combusted gases maintained therein, dropping to the baseline equilibrium value as the piston reaches BDC. Concomitantly, the intake valve and the exhaust valve are maintained closed, allowing the partially combusted gases to do work on the piston.

A second exhaust stroke (depicted here as exhaust_2 stroke) may follow the combustion_2 stroke. During the exhaust_2 stroke, the piston moves from BDC to TDC. During the motion of the piston from BDC to TDC, the exhaust valve transitions from a fully closed position to a fully open position, and back to a fully closed position, allowing the partially combusted gases generated in the cylinder during the previous combustion_1 stroke to be expelled into the exhaust manifold due to the compression of the cylinder. The exhaust valve begins opening when the piston is in BDC, reaches the fully open position when the piston is halfway between BDC and TDC, and fully closes when the piston is in TDC. Correspondingly, the intake valve is maintained in a closed position over the entirety of the second exhaust stroke, fuel injection is maintained off, and the cylinder pressure is maintained at the baseline equilibrium value as throughout the exhaust_1 stroke. Following completion of the exhaust_2 stroke, the method ends, and the engine operation alternates to a cycle of the standard four-stroke engine cycle.

Figure 7:
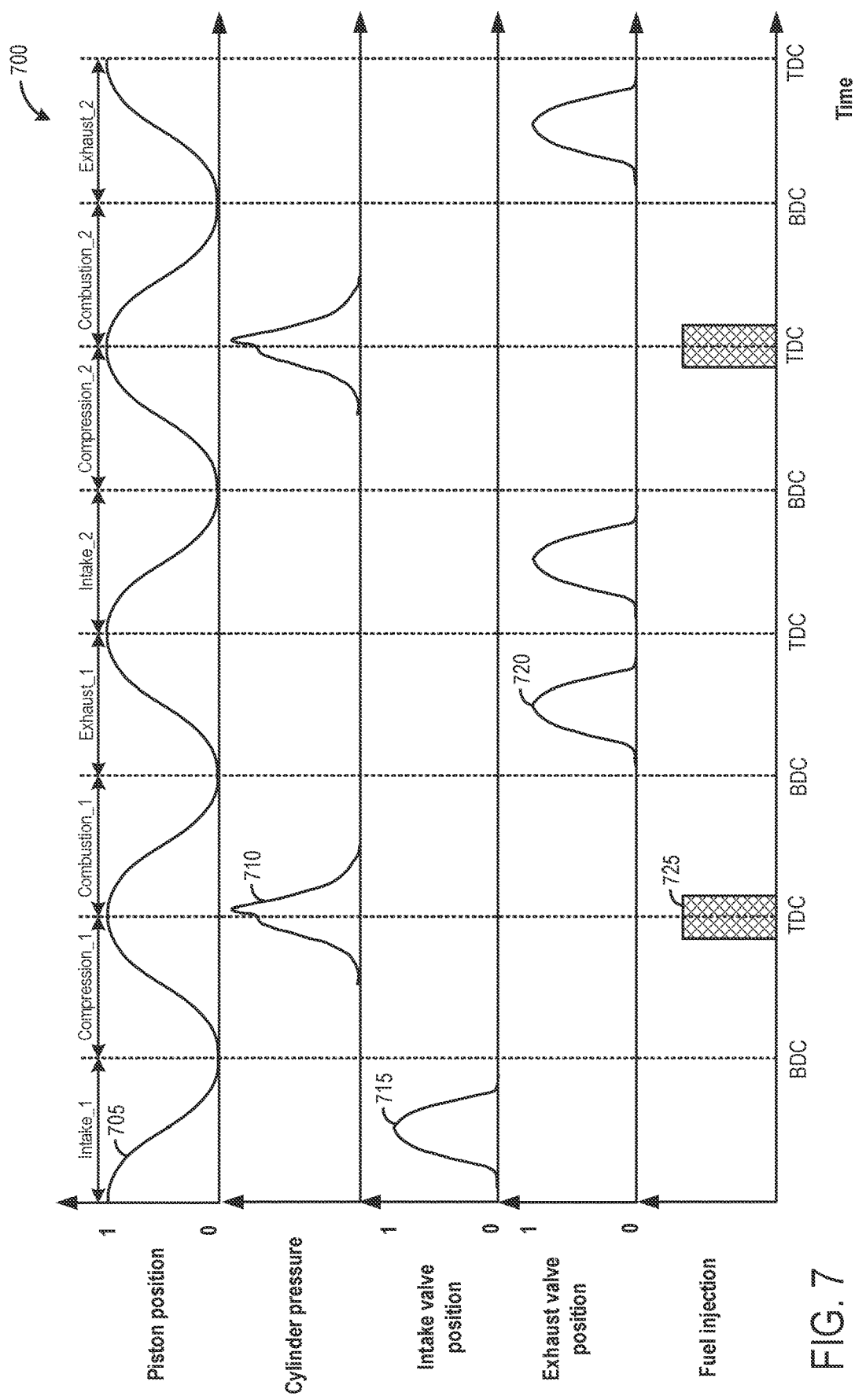
FIG. 7 depicts an example of the modified operation of intake and exhaust valves for rebreathing, according to the method of FIG. 3 of the present disclosure.

FIG. 7 illustrates a timing chart 700 of the modified operation of intake and exhaust valves for rebreathing in an engine cylinder (such as cylinder 30 of FIG. 1), according to the method of FIG. 3 of the present disclosure. Time corresponding to the periodic cycling of a piston (such as piston 36 of FIG. 1), with reference to the top dead center (TDC) and bottom dead center (BDC) extrema within the cycling motion of the piston, is shown along the x-axis. Referring now to the top plot in the timing chart 700, curve 705 depicts a position of a piston (such as piston 36 of FIG. 1) in the engine, with positions (along the y-axis) of the piston ranging from TDC and/or BDC, and with further reference to strokes of the piston within the four strokes (intake, compression, power, and exhaust) of an engine cycle. The curve 705 depicts the piston position in terms of sinusoidally cycling through two conventional cycles of a four-stroke cycle in order to complete rebreathing, with labels intake_1, compression_1, combustion_1, exhaust_1, and intake_2, compression_2, combustion_2, and exhaust_2 labelling the time intervals associated with intake, compression, power, and exhaust strokes. Timing chart 700 further depicts the cylinder pressure in the curve 710, illustrating the change in pressure that occurs in the cylinder over the intake, compression, power, and exhaust strokes. In order for rebreathing depicted in timing chart 700 to occur, operation of an exhaust valve (such as exhaust valve 54 of FIG. 1) is modified from standard operation of a four-stroke cycle. The position of an intake valve (such as intake valve 52 of FIG. 1) during rebreathing is depicted by curve 715, and the corresponding position of the exhaust valve during rebreathing is depicted by curve 720. The fuel injection profile operating during rebreathing is schematically depicted by plot 725.

During a first intake stroke (depicted here as intake_1 stroke), the piston moves from TDC to BDC. At TDC, the intake valve is fully opened and at BDC, the intake valve is fully closed, with the opening of the valve being highest (e.g., maximum valve lift) at the midpoint between TDC and BDC. When the intake valve is in the open position, air from an intake manifold (such as intake manifold 44 of FIG. 1) flows into the cylinder. During the intake stroke, fuel is not injected and combustion is not carried out. Consequently, the cylinder pressure is maintained at a baseline equilibrium value, and the exhaust valve is maintained in a closed position over the entirety of the first intake stroke.

A first compression stroke (depicted here as compression_1 stroke) may follow the intake_1 stroke. During the compression_1 stroke of rebreathing, the piston moves from BDC to TDC. The intake valve and the exhaust valve are both maintained in the closed position. As the piston moves to TDC the air within the cylinder is compressed and the pressure in the cylinder increases as the piston. At the end of the compression stroke, as the piston approaches TDC, fuel is injected into the cylinder. While the fuel injection into the cylinder is depicted in plot 725 as one main injection occurring near the end of the compression_1 stroke, as mentioned in relation to FIG. 3, fuel injection could include a main injection and also one or more pilot injections preceding the main (direct) injection. Further, fuel injection timing may be retarded with respect to the piston reaching TDC as compared to a typical fuel injection event for a four-stroke cycle, in order to maintain $NO_x$ levels and lower noise.

A first combustion stroke (depicted here as combustion_1 stroke) may follow the compression_1 stroke. During the combustion_1 stroke of rebreathing, the piston moves from TDC to BDC. Combustion occurs at the beginning of the combustion_1 stroke, when the piston is at TDC. In one example, the combustion is initiated via spark ignition upon the piston reaching TDC. In another example, the combustion is initiated via compression ignition upon the piston reaching TDC. Correspondingly, due to the energy from the combustion, and the piston is further driven from TDC to BDC. As the piston is driven from TDC to BDC, the pressure in the cylinder decreases with the expansion of the combusted gases, dropping to the baseline equilibrium value as the cylinder reaches BDC. Concomitantly, the intake valve and the exhaust valve are maintained closed, allowing the combusted gases to do work on the piston.

A first exhaust stroke (depicted here as exhaust_1 stroke) may follow the combustion_1 stroke. During the exhaust_1 stroke of rebreathing, the piston moves from BDC to TDC. At BDC, the exhaust valve is fully opened and at TDC, the exhaust valve is fully closed, the opening of the exhaust valve being highest at the midpoint between BDC and TDC. The intake valve is maintained in a closed position and the exhaust gases are not routed to the intake manifold. In the open position, the combusted gases in the cylinder following the previous combustion_1 stroke are expelled into the exhaust manifold. During the exhaust_1 stroke fuel injection is maintained off, and the cylinder pressure is maintained at the baseline equilibrium value.

A second intake stroke (depicted here as intake_2 stroke) may follow the exhaust_1 stroke. During the intake_2 stroke of rebreathing, the piston moves from TDC to BDC. At TDC, the exhaust valve is fully opened and at BDC, the exhaust valve is fully closed, the opening of the valve being highest at the midpoint between TDC and BDC. In the open position, a combination of exhaust gas in the exhaust manifold and partially combusted gases (expelled to the exhaust manifold during the exhaust_1 stroke) from the exhaust manifold flows into the cylinder through a vacuum in the cylinder generated by the motion of the piston. In this way, the combusted air-fuel mixture is rebreathed into the cylinder for re-combustion. The intake valve is maintained in a closed position over the entirety of the second intake stroke, fuel injection is maintained off, and the cylinder pressure is maintained at the baseline equilibrium value as throughout the intake_2 stroke.

A second compression stroke (depicted here as compression_2 stroke) may follow the intake_2 stroke. During the compression_2 stroke of rebreathing, the piston moves from BDC to TDC. The intake valve and the exhaust valve are both maintained in the closed position, such that the pressure in the cylinder increases as the piston compresses the air maintained in the cylinder. Correspondingly, as the piston approaches TDC, fuel is injected into the cylinder. While the fuel injection into the cylinder is depicted in plot 725 as one main injection occurring near the end of the compression_1 stroke, as mentioned in relation to FIG. 3, fuel injection could include a main injection and also one or more pilot injections. In contrast with the compression_1 stroke of rebreathing, the number of pilot injections may be reduced and the injection volume of the pilot injections may be reduced, in order to reduce the possibility of rich operation of the cylinder, and the injection fractions may be optimized to minimize soot emissions. Further, the injection timings of the pilot injections and the main injection are advanced with respect to the piston position as compared to a typical four-stroke engine cycle, additionally to reduce the possibility of rich operation of the cylinder.

A second combustion stroke (depicted here as combustion_2 stroke) may follow the compression_2 stroke. During the combustion_2 stroke of rebreathing, the piston moves from TDC to BDC. Combustion occurs at the beginning of the combustion_1 stroke, when the piston is at TDC. In one example, the combustion is ignited via spark ignition upon the piston reaching TDC. In another example, the combustion is ignited via compression ignition upon the piston reaching TDC. Correspondingly, due to the energy from the combustion, the piston is driven from TDC to BDC. As the piston is driven from TDC to BDC, the pressure in the cylinder decreases with the expansion of the partially combusted gases maintained therein, dropping to the baseline equilibrium value as the piston reaches BDC. Concomitantly, the intake valve and the exhaust valve are maintained closed, allowing the partially combusted gases to do work on the piston.

A second exhaust stroke (depicted here as exhaust_2 stroke) may follow the combustion_2 stroke. During the exhaust_2 stroke, the piston moves from BDC to TDC. During the motion of the piston from BDC to TDC, the exhaust valve transitions from a fully closed position to a fully open position, and back to a fully closed position, allowing the partially combusted gases generated in the cylinder during the previous combustion_1 stroke to be expelled into the exhaust manifold due to the compression of the cylinder. The exhaust valve begins opening when the piston is in BDC, reaches the fully open position when the piston is halfway between BDC and TDC, and fully closes when the piston is in TDC. Correspondingly, the intake valve is maintained in a closed position, fuel injection is maintained off, and the cylinder pressure is maintained at the baseline equilibrium value as throughout the exhaust_1 stroke. Following completion of the exhaust_2 stroke, the method ends, and the engine operation alternates to a cycle of the standard four-stroke engine cycle.

Figure 8:
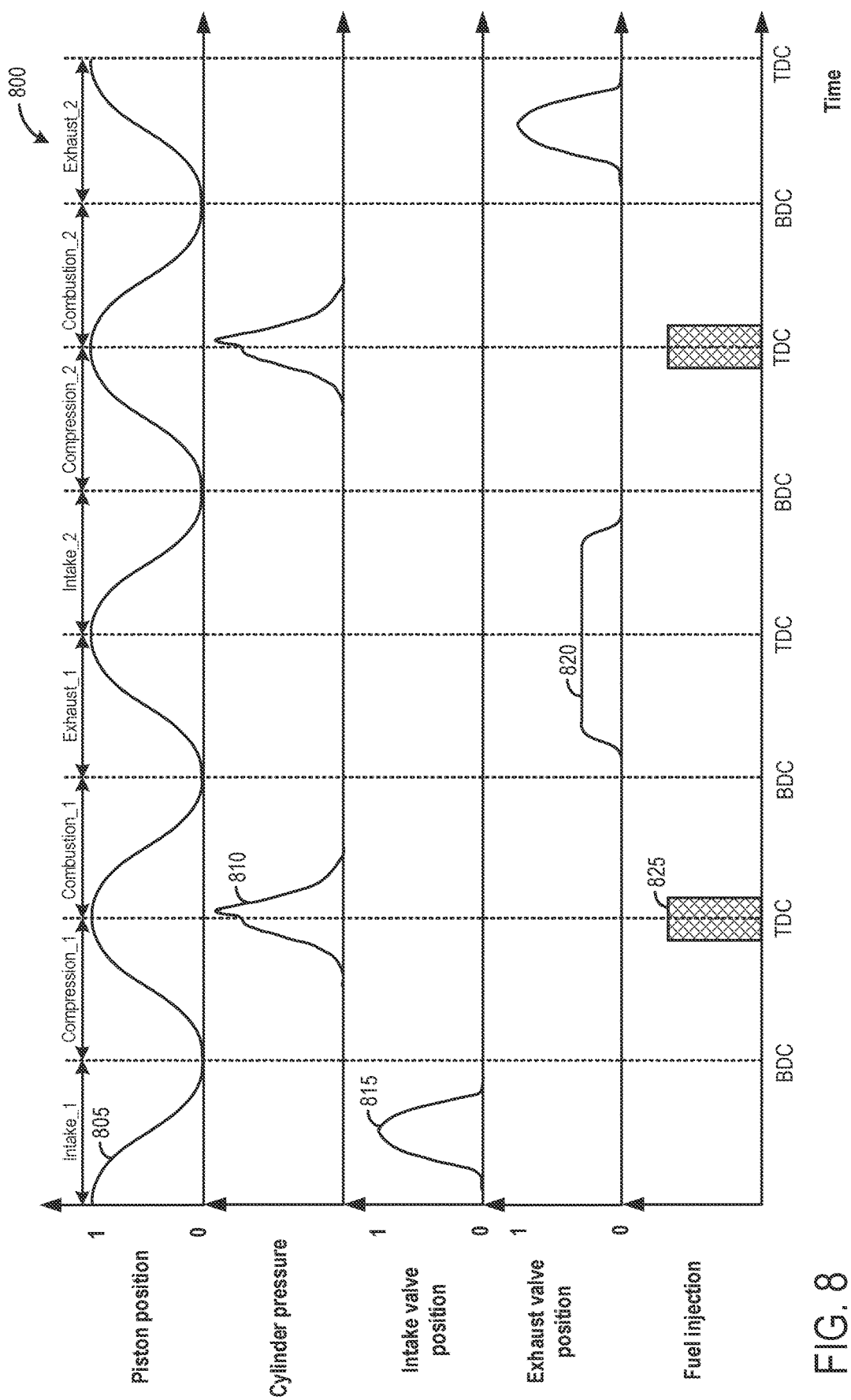
FIG. 8 depicts an example of the modified operation of intake and exhaust valves for rebreathing, according to the method of FIG. 4 of the present disclosure.

FIG. 8 illustrates a timing chart 800 of the modified operation of intake and exhaust valves for rebreathing in an engine cylinder (such as cylinder 30 of FIG. 1), according to the method of FIG. 4 of the present disclosure. Time corresponding to the periodic cycling of a piston (such as piston 36 of FIG. 1), with reference to the top dead center (TDC) and bottom dead center (BDC) extrema within the cycling motion of the piston, is shown along the x-axis. Referring now to the top plot in the timing chart 800, curve 805 depicts a position of a piston (such as piston 36 of FIG. 1) in the engine, with positions (along the y-axis) of the piston ranging from TDC and/or BDC, and with further reference to strokes of the piston within the four strokes (intake, compression, power, and exhaust) of an engine cycle. The curve 805 depicts the piston position in terms of sinusoidally cycling through two conventional cycles of a four-stroke cycle in order to complete rebreathing, with labels intake_1, compression_1, combustion_1, exhaust_1, and intake_2, compression_2, combustion_2, and exhaust_2 labelling the time intervals associated with intake, compression, power, and exhaust strokes. Timing chart 800 further depicts the cylinder pressure in the curve 810, illustrating the change in pressure that occurs in the cylinder over the intake, compression, power, and exhaust strokes. In order for rebreathing depicted in timing chart 800 to occur, operation of an exhaust valve (such as exhaust valve 54 of FIG. 1) is modified from standard operation of a four-stroke cycle, in order to be maintained partially open during the exhaust_1 and intake_2 strokes. A position of an intake valve (such as intake valve 52 of FIG. 1) during rebreathing is depicted by curve 815, and the corresponding exhaust valve position during rebreathing is depicted by curve 820. The fuel injection profile operating during rebreathing is schematically depicted by plot 825.

During a first intake stroke (depicted here as intake_1 stroke), the piston moves from TDC to BDC. At TDC, the intake valve is fully opened and at BDC, the intake valve is fully closed, with the opening of the valve being highest (e.g., maximum valve lift) at the midpoint between TDC and BDC. When the intake valve is in the open position, air from an intake manifold (such as intake manifold 44 of FIG. 1) flows into the cylinder. During the intake stroke, fuel is not injected and combustion is not carried out. Consequently, the cylinder pressure is maintained at a baseline equilibrium value, and the exhaust valve is maintained in a closed position.

A first compression stroke (depicted here as compression_1 stroke) may follow the intake_1 stroke. During the compression_1 stroke of rebreathing, the piston moves from BDC to TDC. The intake valve and the exhaust valve are both maintained in the closed position. As the piston moves to TDC the air within the cylinder is compressed and the pressure in the cylinder increases as the piston. At the end of the compression stroke, as the piston approaches TDC, fuel is injected into the cylinder. While the fuel injection into the cylinder is depicted in plot 825 as one main injection occurring near the end of the compression_1 stroke, as mentioned in relation to FIG. 4, fuel injection could include a main injection and also one or more pilot injections preceding the main (direct) injection. Further, fuel injection timing may be retarded with respect to the piston reaching TDC as compared to a typical fuel injection event for a four-stroke cycle, in order to maintain $NO_x$ levels and lower noise.

A first combustion stroke (depicted here as combustion_1 stroke) may follow the compression_1 stroke. During the combustion_1 stroke of rebreathing, the piston moves from TDC to BDC. Combustion occurs at the beginning of the combustion_1 stroke, when the piston is at TDC. In one example, the combustion is initiated via spark ignition upon the piston reaching TDC. In another example, the combustion is initiated via compression ignition upon the piston reaching TDC. Correspondingly, due to the energy from the combustion, and the piston is further driven from TDC to BDC. As the piston is driven from TDC to BDC, the pressure in the cylinder decreases with the expansion of the combusted gases, dropping to the baseline equilibrium value as the cylinder reaches BDC. Concomitantly, the intake valve and the exhaust valve are maintained closed, allowing the combusted gases to do work on the piston.

A first exhaust stroke (depicted here as exhaust_1 stroke) may follow the combustion_1 stroke. During the exhaust_1 stroke of rebreathing, the piston moves from BDC to TDC. At BDC, the exhaust valve is partially opened and at TDC, the exhaust valve is maintained partially open, the opening of the exhaust valve reaching the partially opened state at the midpoint between BDC and TDC. The intake valve is maintained in a closed position and the exhaust gases are not routed to the intake manifold. In the partially open position, some of the combusted gases in the cylinder following the previous combustion_1 stroke are expelled into the exhaust manifold. During the exhaust_1 stroke fuel injection is maintained off, and the cylinder pressure is maintained at the baseline equilibrium value.

A second intake stroke (depicted here as intake_2 stroke) may follow the exhaust_1 stroke. During the intake_2 stroke of rebreathing, the piston moves from TDC to BDC. At TDC, the exhaust valve is maintained partially opened and at BDC, the exhaust valve is fully closed, the closing of the exhaust valve reaching the fully closed position at the midpoint between BDC and TDC. The intake valve is maintained in a closed position for the entirety of the intake stroke and the air and EGR from the intake manifold are not routed to the cylinder. In the partially open position, some of the combusted gases in the cylinder following the previous combustion_1 stroke, in addition to exhaust gas in the exhaust manifold, are rebreathed into the cylinder. During the intake_2 stroke fuel injection is maintained off, and the cylinder pressure is maintained at the baseline equilibrium value.

A second compression stroke (depicted here as compression_2 stroke) may follow the intake_2 stroke. During the compression_2 stroke of rebreathing, the piston moves from BDC to TDC. The intake valve and the exhaust valve are both maintained in the closed position, such that the pressure in the cylinder increases as the piston compresses the air maintained in the cylinder. Correspondingly, as the piston approaches TDC, fuel is injected into the cylinder. While the fuel injection into the cylinder is depicted in plot 825 as one main injection occurring near the end of the compression_1 stroke, as mentioned in relation to FIG. 4, fuel injection could include a main injection and also one or more pilot injections. In contrast with the compression_1 stroke of rebreathing, the number of pilot injections may be reduced and the injection volume of the pilot injections may be reduced, in order to reduce the possibility of rich operation of the cylinder, and the injection fractions are optimized to minimize soot emissions. Further, the injection timings of the pilot injections and the main injection are advanced with respect to the piston position as compared to a typical four-stroke engine cycle, additionally to reduce the possibility of rich operation of the cylinder.

A second combustion stroke (depicted here as combustion_2 stroke) may follow the compression_2 stroke. During the combustion_2 stroke of rebreathing, the piston moves from TDC to BDC. Combustion occurs at the beginning of the combustion_1 stroke, when the piston is at TDC. In one example, the combustion is ignited via spark ignition upon the piston reaching TDC. In another example, the combustion is ignited via compression ignition upon the piston reaching TDC. Correspondingly, due to the energy from the combustion, the piston is driven from TDC to BDC. As the piston is driven from TDC to BDC, the pressure in the cylinder decreases with the expansion of the partially combusted gases maintained therein, dropping to the baseline equilibrium value as the piston reaches BDC. Concomitantly, the intake valve and the exhaust valve are maintained closed, allowing the partially combusted gases to do work on the piston.

A second exhaust stroke (depicted here as exhaust_2 stroke) may follow the combustion_2 stroke. During the exhaust_2 stroke, the piston moves from BDC to TDC. During the motion of the piston from BDC to TDC, the exhaust valve transitions from a fully closed position to a fully open position, and back to a fully closed position, allowing the partially combusted gases generated in the cylinder during the previous combustion_1 stroke to be expelled into the exhaust manifold due to the compression of the cylinder. The exhaust valve begins opening when the piston is in BDC, reaches the fully open position when the piston is halfway between BDC and TDC, and fully closes when the piston is in TDC. Correspondingly, the intake valve is maintained in a closed position, fuel injection is maintained off, and the cylinder pressure is maintained at the baseline equilibrium value as throughout the exhaust_1 stroke. Following completion of the exhaust_2 stroke, the method ends, and the engine operation alternates to a cycle of the standard four-stroke engine cycle.

Figure 9:
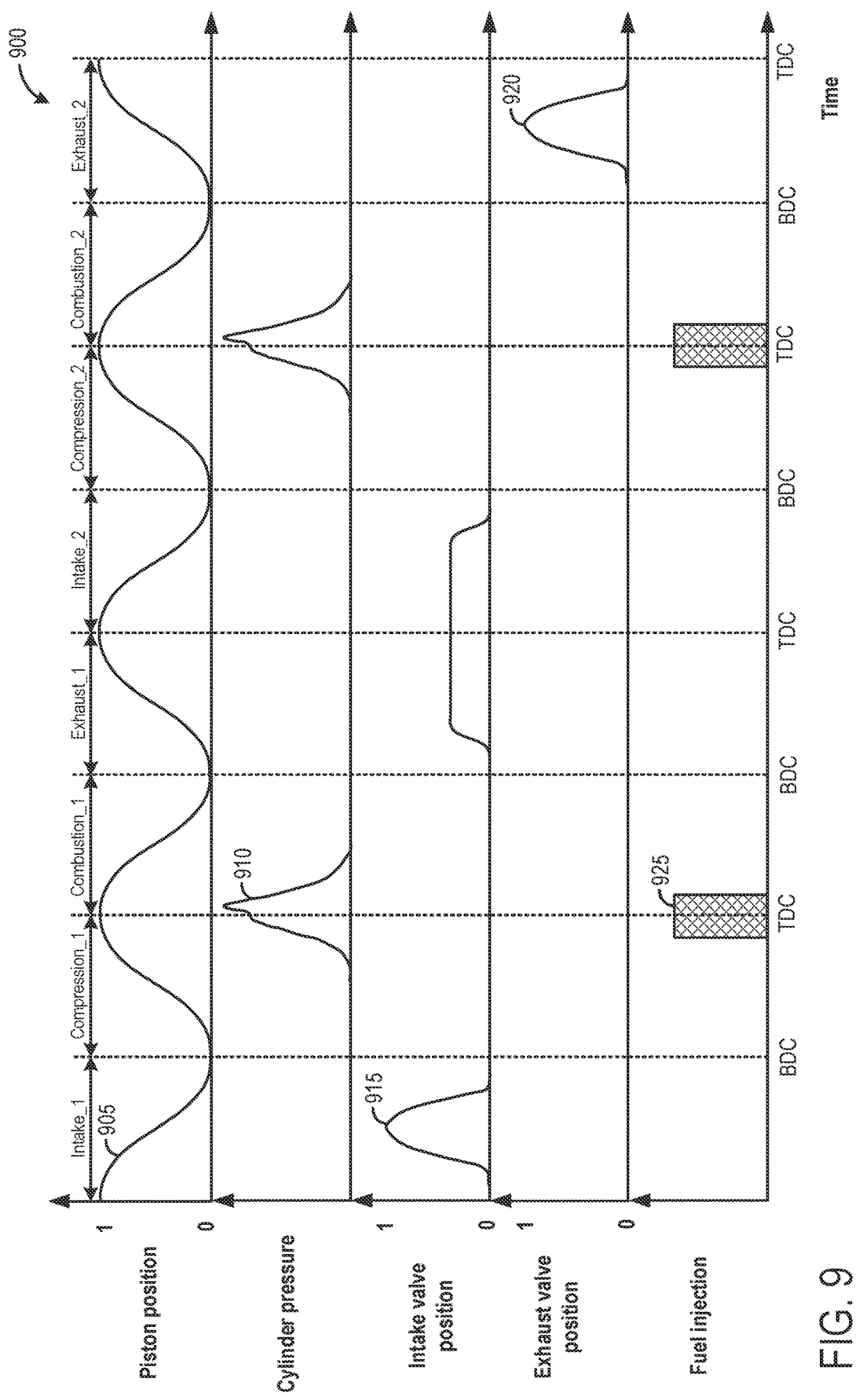
FIG. 9 depicts an example of the modified operation of intake and exhaust valves for rebreathing, according to the method of FIG. 5 of the present disclosure.

FIG. 9 illustrates a timing chart 900 of the modified operation of intake and exhaust valves for rebreathing in an engine cylinder (such as cylinder 30 of FIG. 1), according to the method of FIG. 5 of the present disclosure. The position of the piston, with reference to the TDC and BDC extrema, is shown along the x-axis. Referring now to the top plot in the timing chart 900, curve 905 depicts a position of a piston (such as piston 36 of FIG. 1) in the engine, with positions (along the y-axis) of the piston ranging from top dead center (TDC) and/or bottom dead center (BDC), and with further reference to strokes of the piston within the four strokes (intake, compression, power, and exhaust) of an engine cycle. The curve 905 depicts the piston position in terms of sinusoidally cycling through two conventional cycles of a four-stroke cycle in order to complete rebreathing, with labels intake_1, compression_1, combustion_1, exhaust_1, and intake_2, compression_2, combustion_2, and exhaust_2 labelling the time intervals associated with intake, compression, power, and exhaust strokes. Timing chart 900 further depicts the cylinder pressure in the curve 910, illustrating the change in pressure that occurs in the cylinder over the intake, compression, power, and exhaust strokes. In order for rebreathing depicted in timing chart 900 to occur, operation of an intake valve (such as intake valve 52 of FIG. 1) is modified from standard operation of a four-stroke cycle, in order to be maintained partially open during the exhaust_1 and intake_2 strokes of rebreathing. The intake valve position is depicted by curve 915, and the corresponding modified operation of an exhaust valve (such as exhaust valve 54 of FIG. 1) during rebreathing is depicted by curve 920. The fuel injection profile operating during rebreathing is schematically depicted by plot 925.

During a first intake stroke (depicted here as intake_1 stroke), the piston moves from TDC to BDC. At TDC, the intake valve is fully opened and at BDC, the intake valve is fully closed, with the opening of the valve being highest (e.g., maximum valve lift) at the midpoint between TDC and BDC. When the intake valve is in the open position, air from an intake manifold (such as intake manifold 44 of FIG. 1) flows into the cylinder. During the intake stroke, fuel is not injected and combustion is not carried out. Consequently, the cylinder pressure is maintained at a baseline equilibrium value, and the exhaust valve is maintained in a closed position.

A first compression stroke (depicted here as compression_1 stroke) may follow the intake_1 stroke. During the compression_1 stroke of rebreathing, the piston moves from BDC to TDC. The intake valve and the exhaust valve are both maintained in the closed position. As the piston moves to TDC the air within the cylinder is compressed and the pressure in the cylinder increases as the piston. At the end of the compression stroke, as the piston approaches TDC, fuel is injected into the cylinder. While the fuel injection into the cylinder is depicted in plot 925 as one main injection occurring near the end of the compression_1 stroke, as mentioned in relation to FIG. 5, fuel injection could include a main injection and also one or more pilot injections preceding the main (direct) injection. Further, fuel injection timing may be retarded with respect to the piston reaching TDC as compared to a typical fuel injection event for a four-stroke cycle, in order to maintain $NO_x$ levels and lower noise.

A first combustion stroke (depicted here as combustion_1 stroke) may follow the compression_1 stroke. During the combustion_1 stroke of rebreathing, the piston moves from TDC to BDC. Combustion occurs at the beginning of the combustion_1 stroke, when the piston is at TDC. In one example, the combustion is initiated via spark ignition upon the piston reaching TDC. In another example, the combustion is initiated via compression ignition upon the piston reaching TDC. Correspondingly, due to the energy from the combustion, and the piston is further driven from TDC to BDC. As the piston is driven from TDC to BDC, the pressure in the cylinder decreases with the expansion of the combusted gases, dropping to the baseline equilibrium value as the cylinder reaches BDC. Concomitantly, the intake valve and the exhaust valve are maintained closed, allowing the combusted gases to do work on the piston.

A first exhaust stroke (depicted here as exhaust_1 stroke) may follow the combustion_1 stroke. During the exhaust_1 stroke of rebreathing, the piston moves from BDC to TDC. At BDC, the intake valve is partially opened and at TDC, the intake valve is maintained partially open, the opening of the intake valve reaching the partially opened state at the midpoint between BDC and TDC. The exhaust valve is maintained in a closed position over the entirety of the first exhaust stroke and the exhaust gases are not routed to the exhaust manifold. In the partially open position, some of the combusted gases in the cylinder following the previous combustion_1 stroke are expelled into the intake manifold. During the exhaust_1 stroke fuel injection is maintained off, and the cylinder pressure is maintained at the baseline equilibrium value.

A second intake stroke (depicted here as intake_2 stroke) may follow the exhaust_1 stroke. During the intake_2 stroke of rebreathing, the piston moves from TDC to BDC. At TDC, the intake valve is maintained partially opened and at BDC, the intake valve is fully closed, the closing of the intake valve reaching the fully closed position at the midpoint between BDC and TDC. The exhaust valve is maintained in a closed position and exhaust from the exhaust manifold is not routed to the cylinder. In the partially open position, some of the combusted gases in the cylinder following the previous combustion_1 stroke, in addition fresh air and exhaust gas from exhaust gas recirculation (EGR), are rebreathed into the cylinder. During the intake_2 stroke fuel injection is maintained off, and the cylinder pressure is maintained at the baseline equilibrium value.

A second compression stroke (depicted here as compression_2 stroke) may follow the intake_2 stroke. During the compression_2 stroke of rebreathing, the piston moves from BDC to TDC. The intake valve and the exhaust valve are both maintained in the closed position, such that the pressure in the cylinder increases as the piston compresses the air maintained in the cylinder. Correspondingly, as the piston approaches TDC, fuel is injected into the cylinder. While the fuel injection into the cylinder is depicted in plot 925 as one main injection occurring near the end of the compression_1 stroke, as mentioned in relation to FIG. 5, fuel injection could include a main injection and also one or more pilot injections. In contrast with the compression_1 stroke of rebreathing, the number of pilot injections may be reduced and the injection volume of the pilot injections may be reduced, in order to reduce the possibility of rich operation of the cylinder, and the injection fractions are optimized to minimize soot emissions. Further, the injection timings of the pilot injections and the main injection are advanced with respect to the piston position as compared to a typical four-stroke engine cycle, additionally to reduce the possibility of rich operation of the cylinder.

A second combustion stroke (depicted here as combustion_2 stroke) may follow the compression_2 stroke. During the combustion_2 stroke of rebreathing, the piston moves from TDC to BDC. Combustion occurs at the beginning of the combustion_1 stroke, when the piston is at TDC. In one example, the combustion is ignited via spark ignition upon the piston reaching TDC. In another example, the combustion is ignited via compression ignition upon the piston reaching TDC. Correspondingly, due to the energy from the combustion, the piston is driven from TDC to BDC. As the piston is driven from TDC to BDC, the pressure in the cylinder decreases with the expansion of the partially combusted gases maintained therein, dropping to the baseline equilibrium value as the piston reaches BDC. Concomitantly, the intake valve and the exhaust valve are maintained closed, allowing the partially combusted gases to do work on the piston.

A second exhaust stroke (depicted here as exhaust_2 stroke) may follow the combustion_2 stroke. During the exhaust_2 stroke, the piston moves from BDC to TDC. During the motion of the piston from BDC to TDC, the exhaust valve transitions from a fully closed position to a fully open position, and back to a fully closed position, allowing the partially combusted gases generated in the cylinder during the previous combustion_1 stroke to be expelled into the exhaust manifold due to the compression of the cylinder. The exhaust valve begins opening when the piston is in BDC, reaches the fully open position when the piston is halfway between BDC and TDC, and fully closes when the piston is in TDC. Correspondingly, the intake valve is maintained in a closed position, fuel injection is maintained off, and the cylinder pressure is maintained at the baseline equilibrium value as throughout the exhaust_1 stroke. Following completion of the exhaust_2 stroke, the method ends, and the engine operation alternates to a cycle of the standard four-stroke engine cycle.

FIG. 10 shows a method 1000 for recompression of partially combusted exhaust gas maintained in a cylinder (such as cylinder 30 of FIG. 1) of a multi-cylinder engine (such as engine 10 of FIG. 1) of a vehicle (such as vehicle 100 of FIG. 1).

At 1002, method 1000 may estimate engine operating conditions. Estimating engine operating conditions may involve estimating the engine load and engine speed. As explained in relation to FIG. 1, a profile ignition pickup signal (PIP) from a sensor (such as Hall effect sensor 118 of FIG. 1) coupled to the crankshaft (such as crankshaft 40 of FIG. 1) may be used to determine the engine speed or RPM of the engine. Engine load may be determined through air flow measurements via a including a MAF sensor (such as MAF sensor 120 of FIG. 1). Properties of the exhaust gas upstream of an emission control system (such as emission control system 70 of FIG. 1), such as the exhaust gas air/fuel ratio may be determined via an exhaust gas sensor (such as exhaust gas sensor 126 and/or exhaust gas sensor of FIG. 1). Additionally, the temperature of the exhaust gas within an SCR catalyst (such as SCR catalyst 71 of FIG. 1) may be determined via an SCR sensor (such as SCR catalyst sensor 73 of FIG. 1) or an exhaust temperature sensor in order to determine if the SCR catalyst is operating at a sufficiently high temperature for effective catalytic reaction. Further ambient conditions such as ambient temperature and humidity may be estimated.

At 1004, method 1000 may determine if conditions for initiating recompression are satisfied. Recompression may involve combusting fuel injected into the cylinder via a fuel injector (such as fuel injector 66 of FIG. 1), recompressing the combusted fuel, injecting fuel a second time, and then re-combusting the exhaust/fuel mixture maintained in the cylinder. In one example, recompression may operate on a subset of the total number of cylinders, for example half of the cylinders in the engine. In another example, recompression may operate on all of the cylinders in the engine. The firing order of the cylinders with and without recompression (such as through rebreathing) are described in further detail in relation to FIGS. 12-13. The conditions for initiating recompression may include the engine speed being below a threshold engine speed. For example, the threshold engine speed may be set as the idling speed, or at a near idling speed. As an example, the threshold speed may be in the range of 600-1000 RPM. Alternatively, recompression may be initiated throughout the engine speed range. The conditions for initiating recompression may also include the temperature of an exhaust catalyst being below a threshold temperature. As an example, the threshold temperature may be set as the light off temperature, which is the temperature at which catalysis operates at 50% efficiency. If the exhaust catalyst is below the threshold temperature, recompression may be initiated in order to increase the exhaust gas temperature for more efficient operation of the SCR catalyst. If the conditions for recompression are not satisfied, method 1000 may proceed to 1005 to maintain current engine operating conditions. For example, the current engine operating conditions may include opening the intake valve during the intake stroke, with the exhaust valve closed, and opening the exhaust valve during the exhaust stroke, with the intake valve closed. After returning to maintaining current engine operations, the method may end.

If it is determined that conditions are met for recompression of the engine cylinders, at 1006, method 1000 may open and close an intake valve (such as intake valve 52 of FIG. 1) to intake air from the intake manifold during an intake stroke of the piston. The intake valve may be actuated to open to a fully open position and close to a fully closed position during the motion of the piston from top dead center (TDC) to bottom dead center (BDC). A fully open position may correspond to a maximum valve lift of the intake valve. In particular, the intake valve may begin to open when the piston is at TDC, reach a fully open position when the piston is halfway between TDC and BDC, and reach a fully closed position as the piston reaches BDC. As mentioned in relation to FIG. 1, the intake valve may be actuated by a cam actuation system (such as cam actuation system 51 of FIG. 1) in one embodiment, or by electronic valve actuation. Opening and closing of the intake valve during the intake stroke may allow air from the intake manifold to flow into the cylinder, as a vacuum is generated within the cylinder due to the motion of the piston from TDC to BDC.

At 1008, method 1000 may then determine if the conditions for a first combustion event are met. In one example, the condition for a first combustion event may be that the piston is at the TDC position at the end of a compression stroke to allow for a main injection of fuel via a fuel injector (such as fuel injector 66 of FIG. 1). In another example, the condition for a first combustion event may be that the piston is at an intermediate state between BDC and the TDC position of the compression stroke in order to allow for pilot injection of fuel into the cylinder via the fuel injector. In one example, the injection timing of both the pilot injections and the main injection may be retarded from the piston reaching TDC in order to maintain $NO_x$ levels and lower noise. In another example, pilot injection may also be altered by increasing the number of pilots and increasing the amount of fuel injected via pilot injection to maintain lower noise during conditions when a lower level of exhaust gas recirculation (EGR) is provided to the cylinder(s). The position of the piston may be determined by a crankshaft position sensor. If the conditions for a first combustion event are not met, then method 1000 may proceed to 1009 to wait until conditions are met for the first combustion event, and then may return to 1008.

At 1010, method 1000 may inject fuel for the first combustion event. The injection of fuel for the first combustion event may include fuel injection via one or more pilot injections followed by fuel injection via direct injection. Upon injection of the fuel into the cylinder via the fuel injector, in one example, the fuel may be combusted via spark ignition upon the piston reaching TDC. In another embodiment, the fuel in the cylinder may be ignited via compression ignition. Combustion of the gases in the cylinder may then force the piston downwards, as part of the combustion stroke of the piston.

At 1012, method 1000 may determine if the piston is in a position corresponding to exhaust valve opening (EVO). EVO may correspond to a point in a standard four-stroke engine cycle at which the exhaust valve is opened, prior to the beginning of a subsequent exhaust stroke of the piston, which may begin when the piston reaches BDC. In one example, EVO may be determined by the estimating if the piston position corresponds to the piston position at EVO for a standard four-stroke engine cycle. A piston position corresponding to EVO for a standard four-stroke cycle may be stored in the non-transitory memory of the controller, and the piston position may be estimated by the crankshaft position sensor, and compared to the value stored in the non-transitory memory of the controller. If the piston is not at the position corresponding to EVO for a standard four-stroke cycle, then method 1000 may proceed to 1013 to wait until the piston is at EVO, and then return to 1012. If the piston is at EVO, method 1000 proceeds to 1014.

At 1014, method 1000 may maintain closed the intake valve and the exhaust valve in order for recompression of the combusted exhaust gas maintained in the cylinder to occur. In one example, the intake valve may be actuated by the cam actuation system, which may employ variable valve timing (VVT) via the controller in order to maintain the intake valve closed. Additionally, the exhaust valve may also utilize a cam actuation system (such as cam actuation system 53 of FIG. 1) in order to maintain the exhaust valve in the closed position via VVT as commanded by the controller. The intake valve and the exhaust valve may be maintained closed throughout the motion of the piston from BDC to TDC, and after a second combustion event, in order to increase the temperature of the exhaust after the additional combustion event.

At 1016, method 1000 may optionally inject fuel for an intermediate combustion event in between the first combustion event and a second combustion event. The pilot injection and the main injection for the intermediate combustion event may be advanced to reduce the possibility of rich operation of the engine, and the quantity of pilot injection fuel may be reduced as compared to the first injection of 1010. Upon injection of the fuel into the cylinder via the fuel injector, in one example, the fuel may be combusted via spark ignition upon the piston reaching TDC. In another example, the fuel in the cylinder may be ignited via compression ignition. Combustion of the gases in the cylinder may then force the piston downwards, as part of the combustion stroke of the piston.

At 1018, method 1000 may continue to maintain closed the intake valve and the exhaust valve in order for a combustion stroke of the piston to occur. The intake and exhaust valves being maintained closed throughout the motion of the piston from TDC to BDC may allow partially combusted gases from the intermediate combustion event to do work on the piston as part of the combustion stroke. In one example, the intake valve may be actuated by the cam actuation system, which may employ variable valve timing (VVT) via the controller in order to maintain the intake valve closed. Additionally, the exhaust valve may also utilize the cam actuation system in order to maintain the exhaust valve in the closed position via VVT as commanded by the controller.

At 1020, method 1000 may determine if the conditions are met for a second combustion event. In one example, the condition for a second combustion event may include that the piston is at TDC to allow for a main injection of fuel via a fuel injector. However, the conditions for the second combustion event may be different than the conditions for the first combustion event, owing to the difference in the composition of the intake gas entering the cylinder during the respective intake strokes. In particular, due to the mixture of exhaust gas with intake air, the concentration of oxygen may be reduced, consequently, the injection timing may be advanced in order to avoid rich operation. In another example, due to the already rich gases in the cylinder, the condition for a second combustion event may be that the piston is at an intermediate state between BDC and TDC in order to allow for pilot injection. However, the intermediate state of this example may differ from the intermediate state of the example of 1008, in that it may be closer to TDC than the intermediate state of 1008, to allow for advanced timing of pilot injection. The position of the piston may be determined by the crankshaft position sensor. If the conditions for a second combustion event are not met, then method 1000 may proceed to 1021 to wait until conditions are met for the first combustion event, and then may return to 1020.

At 1022, method 1000 may inject fuel for the second combustion event. As mentioned in 1020, the injection for both pilot injections and a main injection for the first combustion event may be advanced to reduce the possibility of rich operation, and the quantity of pilot injection fuel may be reduced. Upon injection of the fuel into the cylinder via the fuel injector, in one embodiment, the fuel may be combusted via spark ignition upon the piston reaching TDC. In another embodiment, the fuel in the cylinder may be ignited via compression ignition. Combustion of the partially combusted gases in the cylinder may then force the piston downwards, as part of the combustion stroke of the piston.

At 1024, method 1000 may determine if the piston is in a position corresponding to exhaust valve opening (EVO). EVO may correspond to a point in a standard four-stroke engine cycle at which the exhaust valve is opened, prior to the beginning of a subsequent exhaust stroke of the piston, which may begin when the piston reaches BDC. In one example, EVO may be determined by the estimating if the piston position corresponds to the piston position at EVO for a standard four-stroke engine cycle. A piston position corresponding to EVO for a standard four-stroke cycle may be stored in the non-transitory memory of the controller, and the piston position may be estimated by the crankshaft position sensor, and compared to the value stored in the non-transitory memory of the controller. If the piston is not at the position corresponding to EVO for a standard four-stroke cycle, then method 1000 may proceed to 1025 to wait until the piston is at EVO, and then return to 1024. If the piston is at EVO, method 1000 proceeds to 1026.

At 1026, method 1000 may open and close an exhaust valve (such as exhaust valve 54 of FIG. 1) for the exhaust stroke. The exhaust valve may be opened and closed via a cam actuation system. During the exhaust stroke, the piston may shift from BDC to TDC, pushing combusted exhaust gas into an exhaust manifold (such as exhaust manifold 48 of FIG. 1) via the open exhaust valve, which may then be routed through the emission control system and a turbine (not shown).

At 1028, method 1000 may proceed to determine if conditions are met for switching to rebreathing. The conditions for switching to rebreathing may include any one of an increase in noise, vibration, and harshness (NVH) to above a threshold level, decrease of a speed of the engine to below a threshold speed, and/or decrease of engine load to below a threshold load. In particular, the cyclic cylinder deactivation involved in recompression may introduce unwanted NVH, which may be determined by a vibration sensor included in a combustion sensor as described in relation to FIG. 1. The amount of vibration as determined by the vibration sensor may be above a threshold level of vibration, where threshold value may be a factory pre-set value. If the amount of vibration is above the threshold level of vibration, method 1000 may then proceed to 1030 to switch to one of the rebreathing methods 200-500 of FIGS. 2-5, respectively. In addition thereto, below a threshold engine speed, recompression may introduce more NVH than rebreathing. Consequently, if the engine speed is below the threshold engine speed, method 1000 may then proceed to 1030 to switch to one of the rebreathing methods 200-500 of FIGS. 2-5, respectively. Further, below a threshold load, operation of the cyclic cylinder deactivation involved in recompression may also introduce more NVH than rebreathing. Consequently, if the engine load is below the threshold load, method 1000 may then proceed to 1030 to switch to one of the rebreathing methods of 200-500 of FIGS. 2-5, respectively. In one example, transitioning to rebreathing the combusted gases according to method 200 may involve opening the intake valve instead of the exhaust valve during an exhaust stroke to expel the combusted gases into an intake manifold of the engine, then opening the intake valve during an immediately subsequent intake stroke to rebreathe the combusted gases, and then combusting the rebreathed gases.

If it is determined that conditions for switching to rebreathing are not met, then method 1000 may proceed to 1029 to alternate cylinder operation to a standard four-stroke cycle, in which intake air (including EGR) is routed into the cylinder during the intake stroke via the intake valve, and exhaust gas is routed into the exhaust manifold during the exhaust stroke via the exhaust valve. Alternating cylinder operation may include performing a four-stroke cycle, and then returning to performing rebreathing, in a cyclic manner. Method 1000 may then end.

Figure 11:
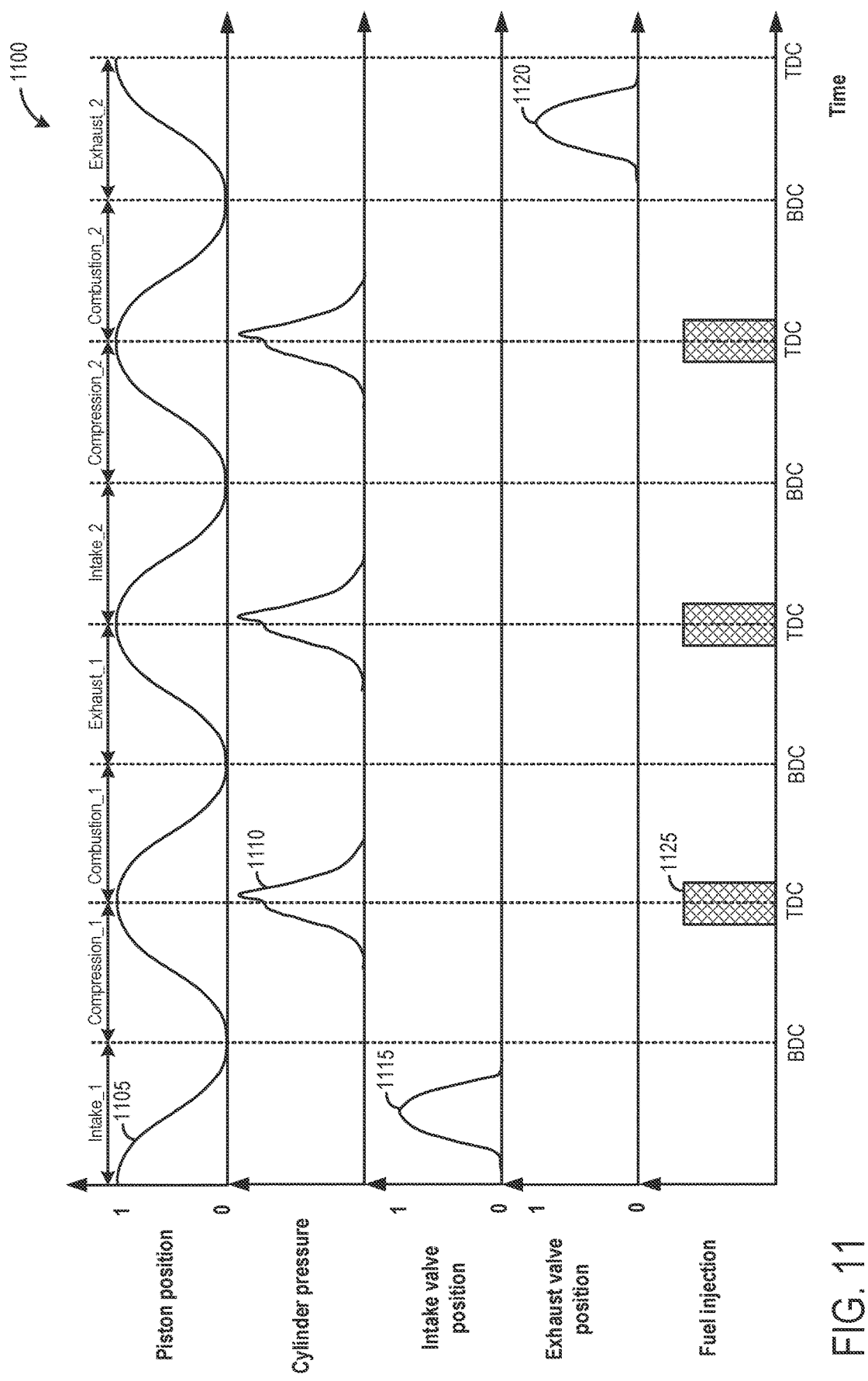
FIG. 11 depicts an example of the modified operation of the intake and exhaust valves for recompression, according to the method of FIG. 10 of the present disclosure.

FIG. 11 illustrates a timing chart 1100 of the modified operation of intake and exhaust valves for rebreathing in an engine cylinder (such as cylinder 30 of FIG. 1), according to the method of FIG. 10 of the present disclosure. Time corresponding to the periodic cycling of a piston (such as piston 36 of FIG. 1), with reference to the top dead center (TDC) and bottom dead center (BDC) extrema within the cycling motion of the piston, is shown along the x-axis. Referring now to the top plot in the timing chart 1100, curve 1105 depicts a position of the piston in the cylinder, with positions (along the y-axis) of the piston ranging from TDC and/or BDC, and with further reference to strokes of the piston within the four strokes (intake, compression, power, and exhaust) of an engine cycle. The curve 1105 depicts the piston position in terms of sinusoidally cycling through two conventional cycles of a four-stroke cycle in order to complete one rebreathing cycle, with labels intake_1, compression_1, combustion_1, exhaust_1, and intake_2, compression_2, combustion_2, and exhaust_2 labelling the time intervals associated with intake, compression, power, and exhaust strokes. Timing chart 1100 further depicts the cylinder pressure in the curve 1110, illustrating the change in pressure that occurs in the cylinder over intake, compression, power, and exhaust strokes. In order for recompression depicted in timing chart 1100 to occur, operation of an intake valve (such as intake valve 52 of FIG. 1) and an exhaust valve (such as exhaust valve 54 of FIG. 1) are modified from standard operation of a four-stroke cycle. The intake valve position during recompression is depicted by curve 1115, and the exhaust valve position during recompression is depicted by curve 1120. The fuel injection profile operating during rebreathing is schematically depicted by plot 1125.

During a first intake stroke (depicted here as intake_1 stroke), the piston moves from TDC to BDC. At TDC, the intake valve is fully opened and at BDC, the intake valve is fully closed, with the opening of the valve being highest (e.g., maximum valve lift) at the midpoint between TDC and BDC. When the intake valve is in the open position, air from an intake manifold (such as intake manifold 44 of FIG. 1) flows into the cylinder. During the intake stroke, fuel is not injected and combustion is not carried out. Consequently, the cylinder pressure is maintained at a baseline equilibrium value, and the exhaust valve is maintained in a closed position.

A first compression stroke (depicted here as compression_1 stroke) may follow the intake_1 stroke. During the compression_1 stroke of rebreathing, the piston moves from BDC to TDC. The intake valve and the exhaust valve are both maintained in the closed position. As the piston moves to TDC the air within the cylinder is compressed and the pressure in the cylinder increases as the piston. At the end of the compression stroke, as the piston approaches TDC, fuel is injected into the cylinder. While the fuel injection into the cylinder is depicted in plot 1125 as one main injection occurring near the end of the compression_1 stroke, as mentioned in relation to FIG. 10, fuel injection could include a main injection and also one or more pilot injections preceding the main (direct) injection. Further, fuel injection timing may be retarded with respect to the piston reaching TDC as compared to a typical fuel injection event for a four-stroke cycle, in order to maintain $NO_x$ levels and lower noise.

A first combustion stroke (depicted here as combustion_1 stroke) may follow the compression_1 stroke. During the combustion_1 stroke of rebreathing, the piston moves from TDC to BDC. Combustion occurs at the beginning of the combustion_1 stroke, when the piston is at TDC. In one example, the combustion is initiated via spark ignition upon the piston reaching TDC. In another example, the combustion is initiated via compression ignition upon the piston reaching TDC. Correspondingly, due to the energy from the combustion, and the piston is further driven from TDC to BDC. As the piston is driven from TDC to BDC, the pressure in the cylinder decreases with the expansion of the combusted gases, dropping to the baseline equilibrium value as the cylinder reaches BDC. Concomitantly, the intake valve and the exhaust valve are maintained closed, allowing the combusted gases to do work on the piston.

A first exhaust stroke (depicted here as exhaust_1 stroke) may follow the combustion_1 stroke. During the exhaust_1 stroke of rebreathing, the piston moves from BDC to TDC. Throughout the motion of the piston from BDC to TDC, both the exhaust valve and the intake valve are maintained closed, in order to allow for recompression of the partially combusted gases maintained in the cylinder. Further, fuel is injected into the cylinder for an intermediate combustion event. The injection for the intermediate combustion event is advanced to reduce the possibility of rich operation of the engine, and the quantity of pilot injection fuel is reduced as compared to the first injection of the compression_1 stroke. Upon injection of the fuel into the cylinder via the fuel injector, in one example, the combination of fuel and partially combusted gases is ignited via spark ignition upon the piston reaching TDC. In another example, the combination of fuel and partially combusted gases in the cylinder is be ignited via compression ignition. Combustion of the fuel and partially combusted gases mixture in the cylinder then force the piston downwards, as part of the intake_2 stroke of the piston.

A second intake stroke (depicted here as intake_2 stroke) may follow the exhaust_1 stroke. During the intake_2 stroke of rebreathing, the piston moves from TDC to BDC. Throughout the piston motion from TDC to BDC, both the intake valve and the exhaust valve are maintained closed, in order to allow for the partially combust gas mixture to force the piston to BDC. Correspondingly, fuel injection is maintained off, and the cylinder pressure decreases from a peak at combustion with the expansion of the combusted gases, dropping to the baseline equilibrium value upon the piston reaching BDC.

A second compression stroke (depicted here as compression_2 stroke) may follow the intake_2 stroke. During the compression_2 stroke of rebreathing, the piston moves from BDC to TDC. The intake valve and the exhaust valve are both maintained in the closed position, such that the pressure in the cylinder increases as the piston compresses the air maintained in the cylinder. Correspondingly, as the piston approaches TDC, fuel is injected into the cylinder. While the fuel injection into the cylinder is depicted in plot 1125 as one main injection occurring near the end of the compression_2 stroke, as mentioned in relation to FIG. 10, fuel injection could include a main injection and also one or more pilot injections. In contrast with the compression_1 stroke of rebreathing, the number of pilot injections may be reduced and the injection volume of the pilot injections may be reduced, in order to reduce the possibility of rich operation of the cylinder, and the injection fractions are optimized to minimize soot emissions. Further, the injection timings of the pilot injections and the main injection are advanced with respect to the piston position as compared to a typical four-stroke engine cycle, additionally to reduce the possibility of rich operation of the cylinder.

A second combustion stroke (depicted here as combustion_2 stroke) may follow the compression_2 stroke. During the combustion_2 stroke of rebreathing, the piston moves from TDC to BDC. Combustion occurs at the beginning of the combustion_1 stroke, when the piston is at TDC. In one example, the combustion is ignited via spark ignition upon the piston reaching TDC. In another example, the combustion is ignited via compression ignition upon the piston reaching TDC. Correspondingly, due to the energy from the combustion, the piston is driven from TDC to BDC. As the piston is driven from TDC to BDC, the pressure in the cylinder decreases with the expansion of the partially combusted gases maintained therein, dropping to the baseline equilibrium value as the piston reaches BDC. Concomitantly, the intake valve and the exhaust valve are maintained closed, allowing the partially combusted gases to do work on the piston.

A second exhaust stroke (depicted here as exhaust_2 stroke) may follow the combustion_2 stroke. During the exhaust_2 stroke, the piston moves from BDC to TDC. During the motion of the piston from BDC to TDC, the exhaust valve transitions from a fully closed position to a fully open position, and back to a fully closed position, allowing the partially combusted gases generated in the cylinder during the previous combustion_1 stroke to be expelled into the exhaust manifold due to the compression of the cylinder. The exhaust valve begins opening when the piston is in BDC, reaches the fully open position when the piston is halfway between BDC and TDC, and fully closes when the piston is in TDC. Correspondingly, the intake valve is maintained in a closed position, fuel injection is maintained off, and the cylinder pressure is maintained at the baseline equilibrium value as throughout the exhaust_1 stroke. Following completion of the exhaust_2 stroke, the method ends, and the engine operation alternates to a cycle of the standard four-stroke engine cycle.

Figure 12:
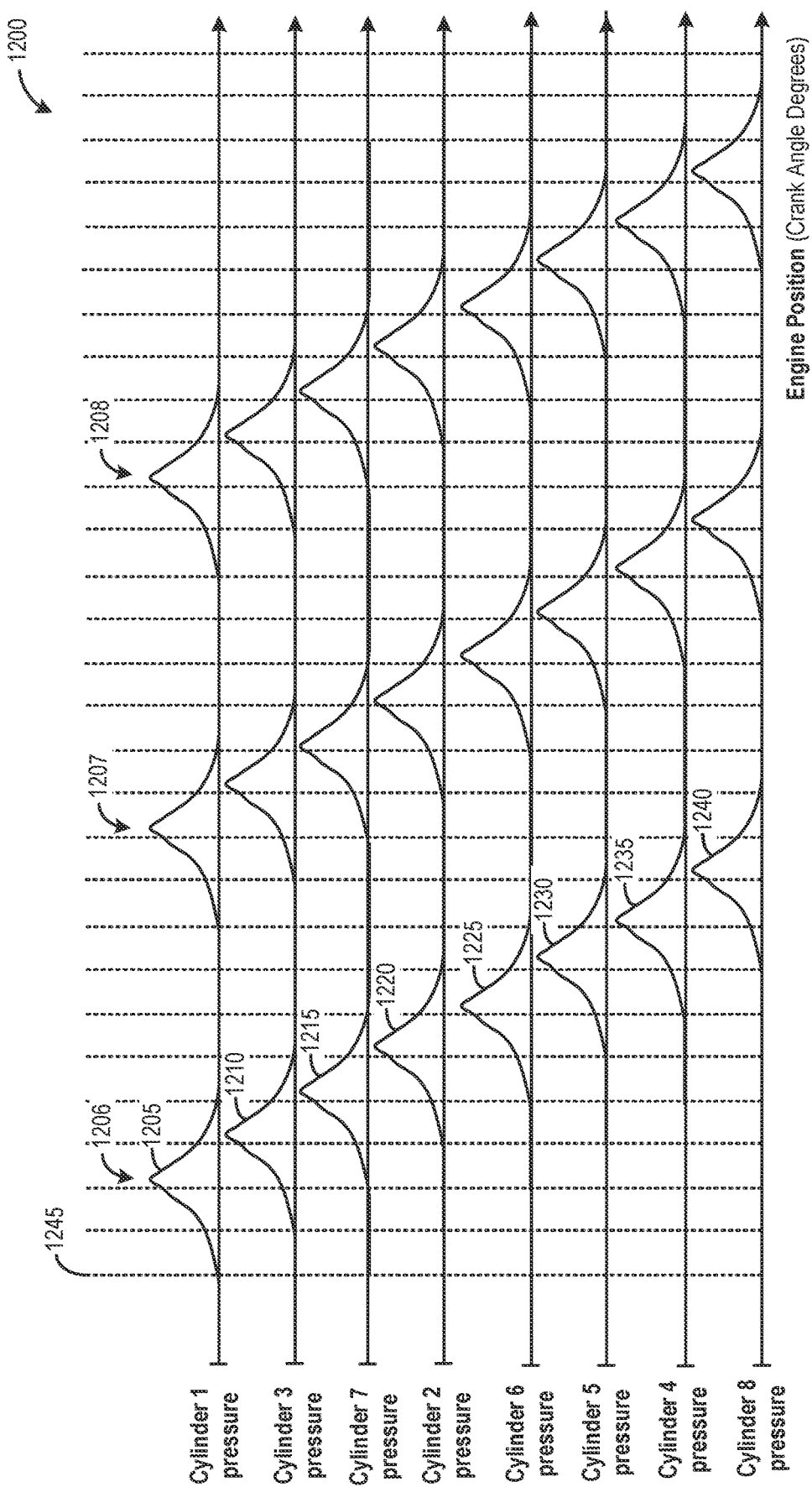
FIG. 12 depicts an example firing sequence for a multi-cylinder engine.
Figure 13:
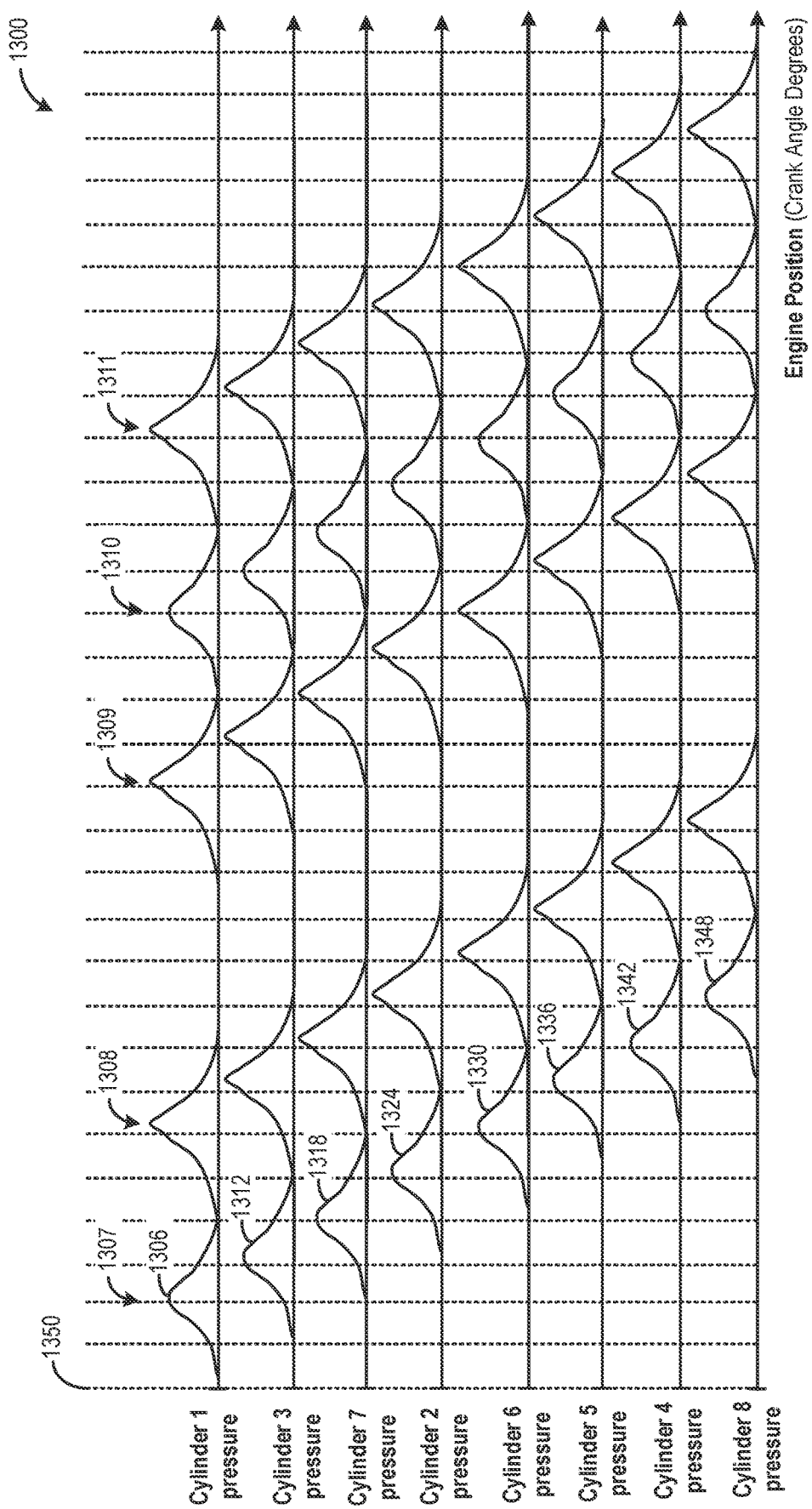
FIG. 13 depicts an example of modifications to the firing sequence of FIG. 12 including cyclic recompression for a multi-cylinder engine.

FIG. 12 illustrates an example timing chart 1200 for a firing sequence of cylinders (such as cylinder 30 of FIG. 1) of a multi-cylinder engine (such as engine 10 of FIG. 1). In this example, the engine includes eight cylinders shown here as cylinders 1-8. The example timing chart 1200 may depict the firing sequence of the multi-cylinder engine under a conventional engine cycle, such as a four-stroke cycle, in which intake air (including EGR) from an intake manifold (such as intake manifold 44 of FIG. 1) is routed into the cylinder during the intake stroke via an intake valve (such as intake valve 52 of FIG. 1), and exhaust gas is routed from an exhaust manifold (such as exhaust manifold 48 of FIG. 1) during the exhaust stroke via an exhaust valve (such as exhaust valve 54 of FIG. 1). However, the firing sequence may be adapted to other engine cycles, including rebreathing and recompression (a firing sequence for recompression for comparison is illustrated in FIG. 13). The x-axis depicts engine position in crank angle degrees, in which each vertical dashed line of the plurality of vertical dashed lines 1245 is evenly spaced and indicates a quarter stroke, or in other words a change in crankshaft angle of 45 degrees. While the example timing chart 1200 depicted in FIG. 12 is operable for an eight-cylinder engine, a firing sequence may also apply to different engine configurations including a different number of operable cylinders, such as a V-6 or I-6 engine, or an I-4 engine.

The example timing chart 1200 shows the cylinder pressures of eight cylinders of the multi-cylinder engine. In particular, the pressure of the first cylinder is depicted in plot 1205, the pressure of the third cylinder is depicted in plot 1210, the pressure of the seventh cylinder is depicted in plot 1215, the pressure of the second cylinder is depicted in plot 1220, the pressure of the sixth cylinder is depicted in plot 1225, the pressure of the fifth cylinder is depicted in 1230, the pressure of the fourth cylinder is depicted in 1235, and the pressure of the eighth cylinder is depicted in 1240. The plots are ordered by firing sequence from the top plot in the example timing chart 1200 to the bottom plot in the example timing chart 1200, such that the firing sequence is 1-3-7-2-6-5-4-8, with each plot of the eight cylinder pressure plots cycling through three cycles of a four-stroke engine cycle for illustrative purposes. For example, the plot 1205 of the pressure of the first cylinder depicts three peaks in cylinder pressure, with a first peak 1206, a second peak 1207, and a third peak 1208, with each peak in cylinder pressure associated with a compression stroke and a subsequent combustion stroke of the cylinder. The firing sequence is timed such that each combustion event is offset by a crankshaft angle of 45 degrees, with the start of a compression stroke for each cylinder starting at a multiple of a crankshaft angle of 45 degrees, as depicted by the alignment of the plots 1205-1240 with the plurality of vertical dashed lines 1245.

FIG. 13 illustrates an example timing chart 1300 for a firing sequence of cylinders (such as cylinder 30 of FIG. 1) of a multi-cylinder engine (such as engine 10 of FIG. 1). The x-axis depicts engine position in crank angle degrees, in which each vertical dashed line of the plurality of vertical dashed lines 1350 is evenly spaced and indicates a quarter stroke, or in other words a change in crankshaft angle of 45 degrees. The example timing chart 1300 may depict the firing sequence of the multi-cylinder engine under a modified firing sequence, wherein each cylinder may operate cyclically via recompression, as described in relation to FIGS. 10 and 11. While the example timing chart 1300 depicted in FIG. 13 is operable for an eight-cylinder engine, a firing sequence may also apply to different engine configurations including a different number of operable cylinders, such as a V-6 or I-6 engine, or an I-4 engine.

The example timing chart 1300 shows the cylinder pressures of eight cylinders of a multi-cylinder engine. In particular, the pressure of the first cylinder is depicted in plot 1306, the pressure of the third cylinder is depicted in plot 1312, the pressure of the seventh cylinder is depicted in plot 1318, the pressure of the second cylinder is depicted in plot 1324, the pressure of the sixth cylinder is depicted in plot 1330, the pressure of the fifth cylinder is depicted in 1336, the pressure of the fourth cylinder is depicted in 1342, and the pressure of the eighth cylinder is depicted in 1348. The plots are ordered by firing sequence from the top plot in the example timing chart 1300 to the bottom plot in the example timing chart 1300, such that the firing sequence is 1-3-7-2-6-5-4-8.

Each plot of the eight cylinder pressure plots cycling through part of a first recompression cycle followed by a complete second recompression cycle, for illustrative purposes. As shown in timing chart 1300, the plot 1306 depicts a first peak 1307 which represents a recompression event without any combustion, followed by a second peak 1308 of a combustion event, in which the already combusted gases maintained in the cylinder, combined with injected fuel, is re-combusted. The second peak 1308 is greater than the first peak 1307, due to combustion event of the second peak 1308. The second recompression cycle shown begins with a third peak 1309, illustrating a first combustion event of the second cycle, followed by a fourth peak 1310, illustrating a recompression event of the second cycle without combustion, followed by a fifth peak 1311, illustrating a second combustion event of the second cycle. The third peak 1309 and the fifth peak 1311 are greater than the fourth peak 1310, due to the first combustion event and second combustion event of the third peak 1309 and the fifth peak 1311, respectively. Similarly, each of the remaining plots of cylinder pressure follows the sequence depicted in the plot 1306 of the pressure of the first cylinder, where each of the remaining plots of cylinder pressure is arranged by the firing sequence. The firing sequence is timed such that each combustion event is offset by a crankshaft angle of 45 degrees, with the start of a compression stroke for each cylinder starting at a multiple of a crankshaft angle of 45 degrees, as depicted by the alignment of the plots 1306-1348 with the plurality of vertical dashed lines 1350.

While the firing sequence depicted in example timing chart 1300 shows each cylinder in the firing sequence 1-3-7-2-6-5-4-8 employing the same recompression sequence offset by a crankshaft angle of 45 degrees, other firing sequences may be employed. In one example, the first four firing cylinders 1-3-7-2 may alternate between a cylinder deactivation cycle and a four-stroke engine cycle, with each of the first four firing cylinders 1-3-7-2 offset by a crankshaft angle of 45 degrees, respectively, while the remaining four firing cylinders 6-5-4-8 may employ recompression, with each of the remaining four firing cylinders 6-5-4-8 offset by a crankshaft angle of 45 degrees, respectively. In another example, the firing sequence 1-3-7-2-6-5-4-8 may include each cylinder cyclically employing recompression, offset by a crankshaft angle of 405 degrees. In yet another example, the above two firing sequence examples may additionally be employed for rebreathing as opposed to recompression.

In this way, by employing rebreathing and recompression in cylinder activation of a multi-cylinder engine, the exhaust gas temperature during engine operation may be increased, leading to more efficient catalytic conversion for reduced emissions. The technical effect of re-combustion of previously combusted exhaust gas either through rebreathing or recompression is to reduce air flow through the engine. In one example, a multi-cylinder engine may utilize rebreathing in order to re-combust a mixture of partially combusted gases with added fuel in order to reduce the amount of air used during operation of the cylinders in the multi-cylinder engine, leading to greater exhaust temperatures. In other example, a multi-cylinder engine may utilize recompression in order to re-combust a mixture of partially combusted gases with added fuel in order to reduce the amount of air used during operation of the cylinders in the multi-cylinder engine, leading to greater exhaust temperatures. Re-combustion of exhaust gases may be used in order to increase the exhaust temperature without the added NVH with cylinder deactivation, which may also be typically used in order to increase the exhaust temperature. Rebreathing and recompression may be utilized in various firing sequences of an engine, allowing for flexibility in implementation. Overall, by using either rebreathing or recompression in a multi-cylinder engine in order to re-combust partially combusted gases in a cylinder, catalyst operation may be maintained above the light-off temperature and emissions quality may be improved.

The disclosure provides support for a method for an engine, comprising: opening an intake valve during an exhaust stroke to expel combusted gases into an intake manifold of the engine, and then rebreathing the combusted gases during an immediately subsequent intake stroke. In a first example of the method, the opening the intake valve during an exhaust stroke includes fully opening the intake valve instead of an exhaust valve during a first exhaust stroke following a first intake stroke, a first compression stroke, and a first combustion event, and a first expansion stroke, the intake valve and the exhaust valve coupled to a single cylinder. In a second example of the method, optionally including the first example, the method further comprises: closing the intake valve at an end of the first exhaust stroke and then immediately reopening the intake valve during an immediately subsequent second intake stroke to rebreathe the combusted gases from the intake manifold. In a third example of the method, optionally including one or both of the first and second examples, the method further comprises: closing the intake valve at an end of the second intake stroke, compressing the combusted gases rebreathed from the intake manifold, carrying out a second combustion event, and then opening the exhaust valve during a second exhaust stroke. In a fourth example of the method, optionally including one or more or each of the first through third examples, the method further comprises: injecting a first amount of fuel during a first injection immediately prior to the first combustion event and a second amount of fuel during a second injection immediately prior to the second combustion event, a first timing for the first injection retarded from top dead center (TDC) and a second injection timing for the second injection advanced from TDC. In a fifth example of the method, optionally including one or more or each of the first through fourth examples, the first injection includes a first number of pilot fuel injections to inject a first amount of fuel and the second injection includes a second number of pilot injections to inject a second amount of fuel, the first number of pilot injections higher than the second number of pilot injections, and the first amount of fuel higher than the second amount of fuel. In a sixth example of the method, optionally including one or more or each of the first through fifth examples, the method further comprises: advancing a closing time of the intake valve during the second intake stroke from an end of the second intake stroke. In a seventh example of the method, optionally including one or more or each of the first through sixth examples, opening the intake valve instead of the exhaust valve includes maintaining the intake valve partially open during the first exhaust stroke and the second intake stroke while the exhaust valve is maintained fully closed. In an eighth example of the method, optionally including one or more or each of the first through seventh examples, the opening of the intake valve during the exhaust stroke is carried out during a speed of the engine being below a threshold speed and a temperature of an exhaust catalyst being below a threshold temperature.

The disclosure also provides support for a method for an engine, comprising: during a first engine cycle of a cylinder, opening an intake valve during a first intake stroke and opening one of the intake valve and an exhaust valve during a first exhaust stroke, and during a second engine cycle of the cylinder immediately following the first engine cycle, opening the one of the intake valve and the exhaust valve during a second intake stroke to rebreathe combusted gases into the cylinder, and then opening the exhaust valve during a second exhaust stroke. In a first example of the method, opening one of the intake valve and the exhaust valve during the first exhaust stroke includes fully opening the intake valve during the first exhaust stroke while maintaining the exhaust valve closed to expel the combusted gases to an intake manifold, and wherein opening the one of the intake valve and the exhaust valve during the second intake stroke includes opening the intake valve during the second intake stroke while maintaining the exhaust valve closed to rebreathe the combusted gases from the intake manifold. In a second example of the method, optionally including the first example, opening one of the intake valve and the exhaust valve during the first exhaust stroke includes fully opening the exhaust valve during the first exhaust stroke while maintaining the intake valve closed to expel the combusted gases to an exhaust manifold, and wherein opening the one of the intake valve and the exhaust valve during the second intake stroke includes opening the exhaust valve during the second intake stroke while maintaining the intake valve closed to rebreathe the combusted gases from the exhaust manifold. In a third example of the method, optionally including one or both of the first and second examples, the method further comprises: injecting a first amount of fuel to the cylinder at an end of a first compression stoke of the first engine cycle to initiate a first combustion, and injecting a second amount of fuel to the cylinder at an end of a second compression stoke of the second engine cycle to initiate a second combustion, the combusted gases rebreathed into the cylinder being re-combusted during the second combustion. In a fourth example of the method, optionally including one or more or each of the first through third examples, the injecting the first amount of fuel is via one or more of a first set of pilot injections and a first direct injection, and wherein the injecting the second amount of fuel is via one or more of a second set of pilot injections and a second direct injection, the first amount of fuel being higher than the second amount. In a fifth example of the method, optionally including one or more or each of the first through fourth examples, the first set of pilot injections include a higher number of pilot injections relative to the second set of pilot injections, and an injection timing of the first set of pilot injections are advanced relative to an injection timing of the second set of pilot injections.

The disclosure also provides support for a system for an engine in a vehicle, comprising: a cylinder including a deactivable intake valve and a deactivable exhaust valve, and a controller storing instructions in non-transitory memory that, when executed, cause the controller to: in response to a temperature of an exhaust catalyst decreasing below a threshold temperature, selectively deactivate the cylinder by closing the intake valve and the exhaust valve of the cylinder for alternating engine cycles, inject fuel to the cylinder one or more times to recompress and re-combust trapped gases in the cylinder, reactivate the cylinder to expel the trapped gases to an exhaust manifold for catalyst heating, and in response to a change in operating conditions of the vehicle, transition from re-compressing trapped gases in the cylinder to rebreathing combusted gases. In a first example of the system, the change in operating conditions of the vehicle include an increase in noise harshness vibration to above a threshold level and/or increase of a speed of the engine to above a threshold speed. In a second example of the system, optionally including the first example, selective deactivation of the cylinder for alternating engine cycles include opening the intake valve during a first intake stroke for a first cycle, combusting air and fuel in the cylinder for a first time, and then deactivating the exhaust valve to trap gases in the cylinder, compressing and expanding the trapped gases in the cylinder twice before opening the exhaust valve. In a third example of the system, optionally including one or both of the first and second examples, the controller includes further instructions to: inject fuel for a first injection event at an end of a first compression stroke of the first cycle, combust the air and fuel for the first time immediately after the first injection event inject fuel for a second injection event at an end of a second compression stroke of a second cycle, combust the trapped gases for a second time immediately after the second injection event, and inject fuel for a third injection event at an end of a third compression stoke of a third cycle combust the trapped gases for a third time immediately after the third injection event, and then open the exhaust valve. In a fourth example of the system, optionally including one or more or each of the first through third examples, the controller includes further instructions to: upon transitioning to rebreathing the combusted gases, opening the intake valve instead of the exhaust valve during an exhaust stroke to expel the combusted gases into an intake manifold of the engine, then opening the intake valve during an immediately subsequent intake stroke to rebreathe the combusted gases, and then re-combusting the combusted gases.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating an engine, comprising:
opening an intake valve of a cylinder of the engine during an exhaust stroke to expel combusted gases from the cylinder into an intake manifold of the engine, closing the intake valve, and then reopening the intake valve and rebreathing the combusted gases via the reopened intake valve from the intake manifold into the cylinder during an immediately subsequent intake stroke.

2. The method of claim 1, wherein the opening the intake valve during the exhaust stroke includes fully opening the intake valve instead of an exhaust valve during a first exhaust stroke following a first intake stroke, a first compression stroke, and a first combustion event, and a first expansion stroke, the intake valve and the exhaust valve coupled to a single cylinder.

3. The method of claim 2, wherein the closing of the intake valve is at an end of the first exhaust stroke, and wherein the reopening of the intake valve is an immediate reopening of the intake valve during an immediately subsequent second intake stroke to rebreathe the combusted gases from the intake manifold.

4. The method of claim 3, further comprising closing the intake valve at an end of the second intake stroke, compressing the combusted gases rebreathed from the intake manifold, carrying out a second combustion event, and then opening the exhaust valve during a second exhaust stroke.

5. The method of claim 4, further comprising injecting a first amount of fuel during a first injection immediately prior to the first combustion event and a second amount of fuel during a second injection immediately prior to the second combustion event, a first timing for the first injection retarded from top dead center (TDC) and a second injection timing for the second injection advanced from TDC.

6. The method of claim 5, wherein the first injection includes a first number of pilot fuel injections to inject a first amount of fuel and the second injection includes a second number of pilot injections to inject a second amount of fuel, the first number of pilot injections higher than the second number of pilot injections, and the first amount of fuel higher than the second amount of fuel.

7. The method of claim 3, further comprising advancing a closing time of the intake valve during the second intake stroke from an end of the second intake stroke.

8. The method of claim 3, wherein opening the intake valve instead of the exhaust valve includes maintaining the intake valve partially open during the first exhaust stroke and the second intake stroke while the exhaust valve is maintained fully closed.

9. The method of claim 1, wherein the opening of the intake valve during the exhaust stroke is carried out responsive to a speed of the engine being below a threshold speed and a temperature of an exhaust catalyst being below a threshold temperature.

10. A method for operating an engine, comprising:
during a first engine cycle of a cylinder of the engine, opening an intake valve of the cylinder during a first intake stroke and opening one of the intake valve and an exhaust valve of the cylinder during a first exhaust stroke, and closing the one of the intake valve and the exhaust valve at an end of the first exhaust stroke; and
during a second engine cycle of the cylinder immediately following the first engine cycle, opening the one of the intake valve and the exhaust valve during a second intake stroke to rebreathe combusted gases into the cylinder via one of an intake manifold and an exhaust manifold, and then opening the exhaust valve during a second exhaust stroke.

11. The method of claim 10, wherein opening one of the intake valve and the exhaust valve during the first exhaust stroke includes fully opening the intake valve during the first exhaust stroke while maintaining the exhaust valve closed to expel the combusted gases to the intake manifold, and wherein opening the one of the intake valve and the exhaust valve during the second intake stroke includes opening the intake valve during the second intake stroke while maintaining the exhaust valve closed to rebreathe the combusted gases from the intake manifold.

12. The method of claim 10, wherein opening one of the intake valve and the exhaust valve during the first exhaust stroke includes fully opening the exhaust valve during the first exhaust stroke while maintaining the intake valve closed to expel the combusted gases to the exhaust manifold, and wherein opening the one of the intake valve and the exhaust valve during the second intake stroke includes opening the exhaust valve during the second intake stroke while maintaining the intake valve closed to rebreathe the combusted gases from the exhaust manifold.

13. The method of claim 10, further comprising injecting a first amount of fuel to the cylinder at an end of a first compression stoke of the first engine cycle to initiate a first combustion, and injecting a second amount of fuel to the cylinder at an end of a second compression stoke of the second engine cycle to initiate a second combustion, the combusted gases rebreathed into the cylinder being re-combusted during the second combustion.

14. The method of claim 13, wherein the injecting the first amount of fuel is via one or more of a first set of pilot injections and a first direct injection, and wherein the injecting the second amount of fuel is via one or more of a second set of pilot injections and a second direct injection, the first amount of fuel being higher than the second amount.

15. The method of claim 14, wherein the first set of pilot injections includes a higher number of pilot injections relative to the second set of pilot injections, and an injection timing of the first set of pilot injections is advanced relative to an injection timing of the second set of pilot injections.

\* \* \* \* \*